(12) United States Patent
Kothuri et al.

(10) Patent No.: US 11,695,673 B2
(45) Date of Patent: Jul. 4, 2023

(54) SYSTEM AND METHOD FOR COLLECTING CONSUMPTION

(71) Applicant: Nutanix, Inc., San Jose, CA (US)

(72) Inventors: Venkata Vamsi Krishna Kothuri, San Jose, CA (US); Chaoyi Fu, San Jose, CA (US); Sravan Kumar Muthyala, Bangalore (IN); Manoj Badola, Bangalore (IN)

(73) Assignee: Nutanix, Inc., San Jose, CA (US)

( * ) Notice: Subject to any disclaimer, the term of this patent is extended or adjusted under 35 U.S.C. 154(b) by 0 days.

(21) Appl. No.: 17/377,106

(22) Filed: Jul. 15, 2021

(65) Prior Publication Data
US 2022/0385555 A1    Dec. 1, 2022

(30) Foreign Application Priority Data
May 31, 2021    (IN) .............................. 202141024135

(51) Int. Cl.
*H04L 43/0876*    (2022.01)
*H04L 12/14*    (2006.01)

(52) U.S. Cl.
CPC .......... *H04L 43/0876* (2013.01); *H04L 12/14* (2013.01); *H04L 12/1435* (2013.01)

(58) Field of Classification Search
None
See application file for complete search history.

(56) References Cited

U.S. PATENT DOCUMENTS

| | | | |
|---|---|---|---|
| 6,209,128 B1 | 3/2001 | Gerard et al. | |
| 6,775,673 B2 | 8/2004 | Mahalingam et al. | |
| 7,653,668 B1 | 1/2010 | Shelat et al. | |
| 8,019,732 B2 | 9/2011 | Paterson-Jones et al. | |
| 8,166,128 B1 | 4/2012 | Faulkner et al. | |
| 8,250,033 B1 | 8/2012 | De Souter et al. | |
| 8,352,424 B2 | 1/2013 | Zunger et al. | |
| 8,549,518 B1 | 10/2013 | Aron et al. | |
| 8,554,724 B2 | 10/2013 | Zunger | |
| 8,601,473 B1 | 12/2013 | Aron et al. | |

(Continued)

OTHER PUBLICATIONS

"Adding Objects to Versioning-Enabled Buckets", from https://docs.aws.amazon.com/AmazonS3/latest/dev/AddingObjectstoVersioningEnabledBuckets.html, (Oct. 2, 2019).

(Continued)

*Primary Examiner* — Chris Parry
*Assistant Examiner* — Abderrahmen Chouat
(74) *Attorney, Agent, or Firm* — Foley & Lardner LLP

(57) ABSTRACT

Various embodiments disclosed herein are related to a non-transitory computer readable storage medium. In some embodiments, the medium includes instructions stored thereon that, when executed by a processor, cause the processor to identify, at an edge network, resource consumption data including a status that indicates whether a service hosted on a cluster of nodes on the edge network is powered on, a type of a resource being consumed by the service, a quantity of the resource being consumed by the service, and a time stamp associated with the resource being consumed by the service and provide, to a remote server in communication with the edge network, the resource consumption data. In some embodiments, the remote server meters resource consumption based on the resource consumption data.

20 Claims, 12 Drawing Sheets

(56) References Cited

U.S. PATENT DOCUMENTS

| | | |
|---|---|---|
| 8,849,759 B2 | 9/2014 | Bestler et al. |
| 8,850,130 B1 | 9/2014 | Aron et al. |
| 8,863,124 B1 | 10/2014 | Aron |
| 8,930,693 B2 | 1/2015 | Holt et al. |
| 9,009,106 B1 | 4/2015 | Aron et al. |
| 9,043,372 B2 | 5/2015 | Makkar et al. |
| 9,052,942 B1 | 6/2015 | Barber et al. |
| 9,069,708 B2 | 6/2015 | Gill et al. |
| 9,069,983 B1 | 6/2015 | Nijjar |
| 9,336,132 B1 | 5/2016 | Aron et al. |
| 9,405,806 B2 | 8/2016 | Lysne et al. |
| 9,652,265 B1 | 5/2017 | Narayanasamy et al. |
| 9,747,287 B1 | 8/2017 | Bhardwaj et al. |
| 9,772,866 B1 | 9/2017 | Aron et al. |
| 9,805,054 B2 | 10/2017 | Davis et al. |
| 10,003,650 B2 | 6/2018 | Shetty et al. |
| 10,380,078 B1 | 8/2019 | Kumar et al. |
| 10,409,837 B1 | 9/2019 | Schmidt et al. |
| 10,740,302 B2 | 8/2020 | Slik et al. |
| 2003/0023587 A1 | 1/2003 | Dennis et al. |
| 2005/0114158 A1 | 5/2005 | Albaugh et al. |
| 2006/0080646 A1 | 4/2006 | Aman |
| 2011/0082962 A1 | 4/2011 | Horovitz et al. |
| 2011/0213884 A1 | 9/2011 | Ferris et al. |
| 2012/0096052 A1 | 4/2012 | Tolia et al. |
| 2012/0331243 A1 | 12/2012 | Aho et al. |
| 2013/0086252 A1 | 4/2013 | Cutler et al. |
| 2013/0167240 A1* | 6/2013 | Kelekar ............... G06F 21/554 726/25 |
| 2013/0332608 A1 | 12/2013 | Shiga et al. |
| 2014/0058908 A1 | 2/2014 | Gupta et al. |
| 2015/0067171 A1* | 3/2015 | Yum .................... H04L 67/562 709/226 |
| 2015/0378767 A1 | 12/2015 | Tarasuk-Levin et al. |
| 2016/0048408 A1 | 2/2016 | Madhu et al. |
| 2016/0105512 A1 | 4/2016 | Richter et al. |
| 2016/0275125 A1 | 9/2016 | Drobychev et al. |
| 2017/0075909 A1 | 3/2017 | Goodson et al. |
| 2017/0109421 A1 | 4/2017 | Stearn et al. |
| 2017/0242746 A1 | 8/2017 | King et al. |
| 2017/0344575 A1 | 11/2017 | Naylor et al. |
| 2017/0351450 A1 | 12/2017 | Brandl et al. |
| 2018/0124253 A1 | 5/2018 | Xu et al. |
| 2018/0167424 A1 | 6/2018 | Nair et al. |
| 2018/0292999 A1 | 10/2018 | Nadkarni |
| 2019/0004863 A1 | 1/2019 | Mainali et al. |
| 2019/0050296 A1 | 2/2019 | Luo et al. |
| 2019/0171495 A1 | 6/2019 | Knaup et al. |
| 2019/0213179 A1 | 7/2019 | McHugh et al. |
| 2020/0019475 A1 | 1/2020 | Karmarkar et al. |
| 2020/0036787 A1 | 1/2020 | Gupta et al. |
| 2020/0042364 A1* | 2/2020 | Kumar Shimoga Manjunatha ..... H04L 41/0893 |
| 2020/0145283 A1* | 5/2020 | Zeng ...................... H04L 41/40 |
| 2020/0162380 A1 | 5/2020 | Pilkington et al. |
| 2020/0387510 A1 | 12/2020 | Ransil et al. |
| 2020/0409769 A1 | 12/2020 | Carroll et al. |
| 2021/0019194 A1 | 1/2021 | Bahl et al. |
| 2021/0042160 A1* | 2/2021 | Alamouti ............. G06F 9/5011 |
| 2021/0117859 A1 | 4/2021 | Rogers et al. |
| 2021/0329596 A1* | 10/2021 | Freda ................. H04W 72/541 |
| 2021/0405097 A1* | 12/2021 | Campbell ............ G01R 21/006 |

OTHER PUBLICATIONS

"AWS Pricing"; Amazon Web Services; https://aws.amazon.com/pricing/; Webpage accessed on Jun. 23, 2021; pp. 1-9.
"Cloud & Hosting Services—Building a Cloud Infrastructure"; NetApp; https://www.netapp.com/hybrid-cloud/service-provider-infrastructure/; webpage accessed on Jun. 23, 2021; pp. 1-11.
"Configure a Pod to Use a ConfigMap", from https://kubernetes.io/docs/tasks/configure-pod-container/configure-pod-configmap/,(Oct. 2, 2019).
"Creating an NFS file share"; AWS Storage Gateway—User Guide; https://docs.aws.amazon.com/storagegateway/latest/userguide/CreatingAnNFSFileShare.html; webpage accessed on Oct. 28, 2020; pp. 1-10.
"Deployments", from https://kubernetes.io/docs/concepts/workloads/controllers/deployment/,(Oct. 2, 2019).
"IT Service Provider Technology Solutions and Services"; HPE—Hewlett Packard; https://www.hpe.com/us/en/solutions/service-providers.html?parentPage=/us/en/solutions/service-providers; Webpage accessed on Jun. 23, 2021; pp. 1-6.
"Managed VMware Cloud Services"; VMware; https://cloud.vmware.com/providers/managed-services-provider; Webpage accessed on Jun. 23, 2021; pp. 1-5.
"Managing your storage lifecycle"; Amazon Simple Storage Service; https://docs.aws.amazon.com/AmazonS3/latest/userguide/object-lifecycle-mgmt.html; webpage accessed on Jun. 18, 2021; pp. 1-2.
"Nutanix Solution for Service Providers"; Nutanix, Inc. Solution Brief; https://aemstage.nutanix.cn/viewer?type=pdf&path=/content/dam/nutanix/resources/solution-briefs/sb-service-provider-solution-brief.pdf&icid=67VMYKPR6K6O; 2020; pp. 1-3.
"Per Virtual Machine Licensing"; VMware Per VM Pricing & Licensing Help; https://www.vmware.com/support/support-resources/licensing/per-vm.html; Webpage accessed on Jun. 23, 2021; pp. 1-7.
"Retrieving Object Versions", from https://docs.aws.amazon.com/AmazonS3/latest/dev/RetrievingObjectVersions.html, (Oct. 2, 2019).
"Set up Cluster Federation with Kubefed—Kubernetes", from https://v1-14.docs.kubernetes.io/docs/tasks/federation/set-up-cluster-federation-kubefed/, (Apr. 17, 2020).
"Storage Tiering"; VMware Docs; https://docs.vmware.com/en/VMware-Validated-Design/5.0/com.vmware.vvd.sddc-design.doc/GUID-20D2BC02-4500-462F-A353-F9B613CC07AC.html; webpage accessed on Jun. 18, 2021; pp. 1-3.
"SwiftOnFile"; Object Storage-Gluster Docs; v: release3.7.0beta1; https://staged-gluster-docs.readthedocs.io/en/release3.7.0beta1/Administrator%20Guide/Object%20Storage/; webpage accessed on Oct. 28, 2020; pp. 1-2.
"Transitioning objects using Amazon S3 Lifecycle"; Amazon Simple Storage Service; https://docs.aws.amazon.com/AmazonS3/latest/userguide/lifecycle-transition-general-considerations.html; Webpage was accessed on Jun. 18, 2021; pp. 1-5.
"Using Amazon S3 storage classes"; Amazon Simple Storage Service; https://docs.aws.amazon.com/AmazonS3/latest/userguide/storage-class-intro.html; Webpage accessed on Jun. 16, 2021; pp. 1-6.
"Volumes", from https://kubernetes.io/docs/concepts/storage/volumes/, (Oct. 2, 2019).
AWS Storage Gateway "Creating an NFS file share" (Oct. 28, 2020) from https://docs.aws.amazon.com/storagegateway/latest/userguide/CreatingAnNFSFileShare.html, pp. 1-10.
B Tree Indexes. http://web.csulb.edu/-amonge/classes/common/db/B TreeIndexes.html, Aug. 4, 2018, pp. 1-7 (2018).
Cano, Ignacio, et al. "Curator: Self-Managing Storage for Enterprise Clusters" (Mar. 27, 2017), from https://www.usenix.org/conference/nsdi17/.
Gowri Balasubramanian; "Should Your DynamoDB Table Be Normalized or Denormalized?"; AWS Database Blog; https://aws.amazon.com/blogs/database/should-your-dynamodb-table-be-normalized-or-denormalized/; Dec. 5, 2016; pp. 1-5.
Luis Ayuso; "How to Report Monthly Usage with the Flex Pricing Model"; VMware Cloud Provider Blog; May 20, 2019; pp. 1-6.
Luis Ayuso; "How to Sign Up for the new VCPP Flex Pricing Model"; VMware Cloud Provider Blog; May 20, 2019; pp. 1-6.
Luis Ayuso; "New VCPP Pricing Model Simplifies Delivering Services"; VMware Cloud Provider Blog; May 20, 2019; pp. 1-6.
Michael Bose "A guide on how to Mount Amazon S3 as a Drive for Cloud File Sharing" (Jun. 17, 2020) from https://www.nakivo.com/blog/mount-amazon-s3-as-a-drive-how-to-guide, pp. 1-27.
Michael Bose; "A Guide on How to Mount Amazon S3 as a Drive for Cloud File Sharing"; Nakivo Blog-Cloud-Backup to Cloud; https://www.nakivo.com/blog/mount-amazon-s3-as-a-drive-how-to-guide/; Published Jun. 17, 2020; pp. 1-27.
Mike Deck; "Building and Maintaining an Amazon S3 Metadata Index without Servers"; AWS Big Data Blog; https://aws.amazon.

(56) References Cited

OTHER PUBLICATIONS com/blogs/big-data/building-and-maintaining-an-amazon-s3-metadata-index-without-servers/; Aug. 12, 2015; pp. 1-6.
Object Storage—Cluster Docs, "SwiftOnFile" (Oct. 28, 2020) from https://staged-gluster-docs.readthedocs.io/en/release3.7.0beta1/Administrator%20Guide/Object%20Storage, pp. 1-2.
Poitras, Steven. "The Nutanix Bible" (Jan. 11, 2014), from http://stevenpoitras.com/the-nutanix-bible/ (Publication date based on indicated capture date by Archive.org; first publication date unknown).
Poitras, Steven. "The Nutanix Bible" (Oct. 15, 2013), from http://stevenpoitras.com/the-nutanix-bible/ (Publication date based on indicated capture date by Archive.org; first publication date unknown).
Poitras, Steven. "The Nutanix Bible" (Sep. 17, 2019), from https://nutanixbible.com/.
Poitras, Steven. "The Nutanix Bible" (Jun. 20, 2014), from http://stevenpoitras.com/the-nutanix-bible/ (Publication date based on indicated capture date by Archive.org; first publication date unknown).
Poitras, Steven. "The Nutanix Bible" (Jan. 7, 2015), from http://stevenpoitras.com/the-nutanix-bible/ (Publication date based on indicated capture date by Archive.org; first publication date unknown).
Poitras, Steven. "The Nutanix Bible" (Jun. 9, 2015), from http://stevenpoitras.com/the-nutanix-bible/ (Publication date based on indicated capture date by Archive.org; first publication date unknown).
Stopford. Log Structured Merge Trees. http://www.benstopford.com/2015/02/14/ log-structured-merge-trees, 2015, pp. 1-8 (2015).
The Nutanix Bible; from https://nutanixbible.com/; accessed on Jan. 12, 2016.
The Nutanix Bible; from https://nutanixbible.com/; accessed on Jun. 25, 2018.
The Nutanix Bible; from https://nutanixbible.com/; accessed on Jan. 3, 2017.
The Nutanix Bible; from https://nutanixbible.com/; accessed on Jan. 3, 2018.
The Nutanix Bible; from https://nutanixbible.com/; accessed on Sep. 4, 2015.
The Nutanix Bible; from https://nutanixbible.com/; accessed on Jan. 8, 2019.
The Nutanix Bible; from https://nutanixbible.com/; accessed on Jun. 8, 2017.
The Nutanix Bible; from https://nutanixbible.com/; accessed on Jun. 9, 2016.
Non-Final Office Action on U.S. Appl. No. 17/375,910 dated Jan. 5, 2023.
The Nutanix Bible; from https://nutanixbible.com/; accessed on Nov. 22, 2022.

* cited by examiner

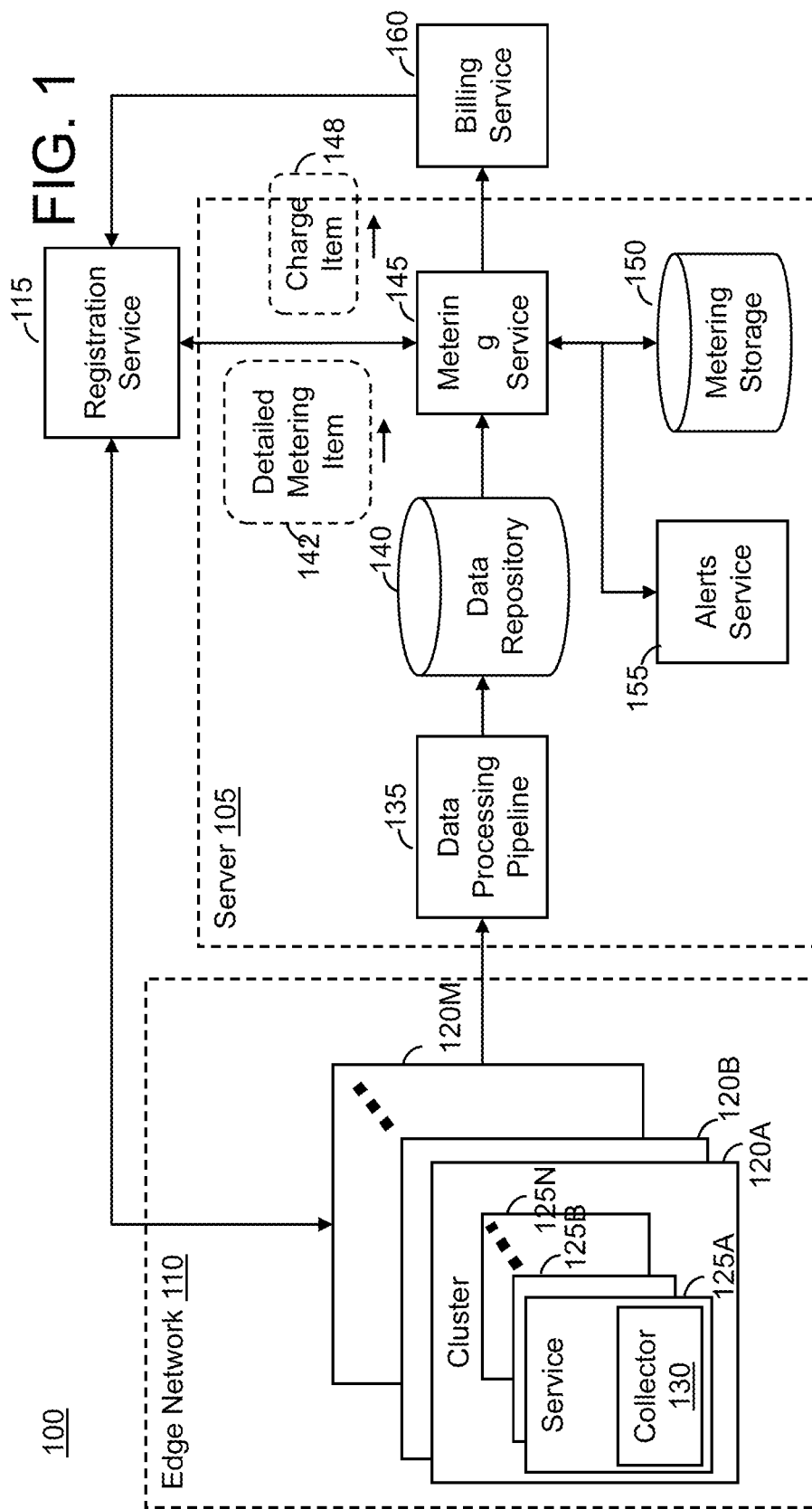

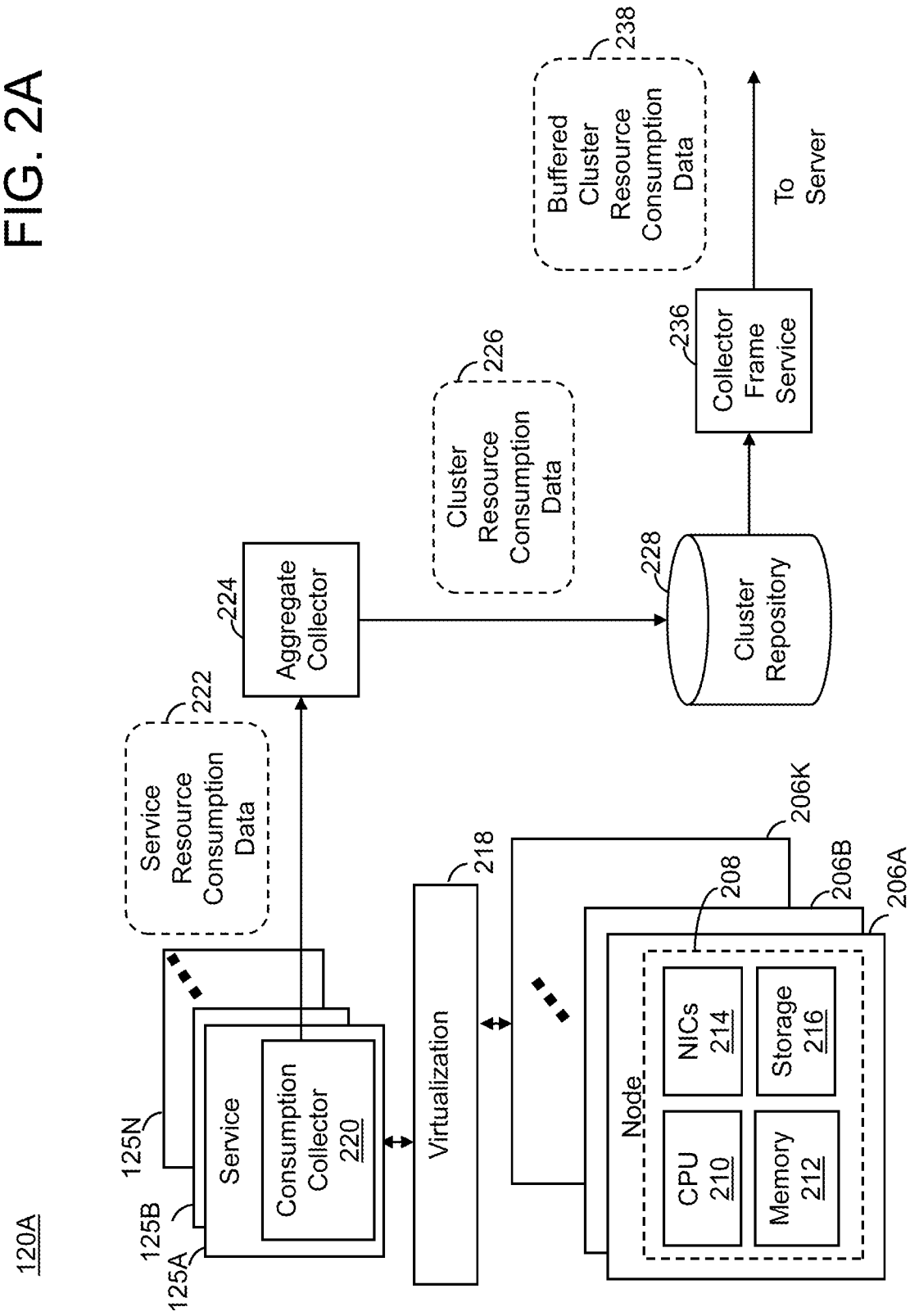

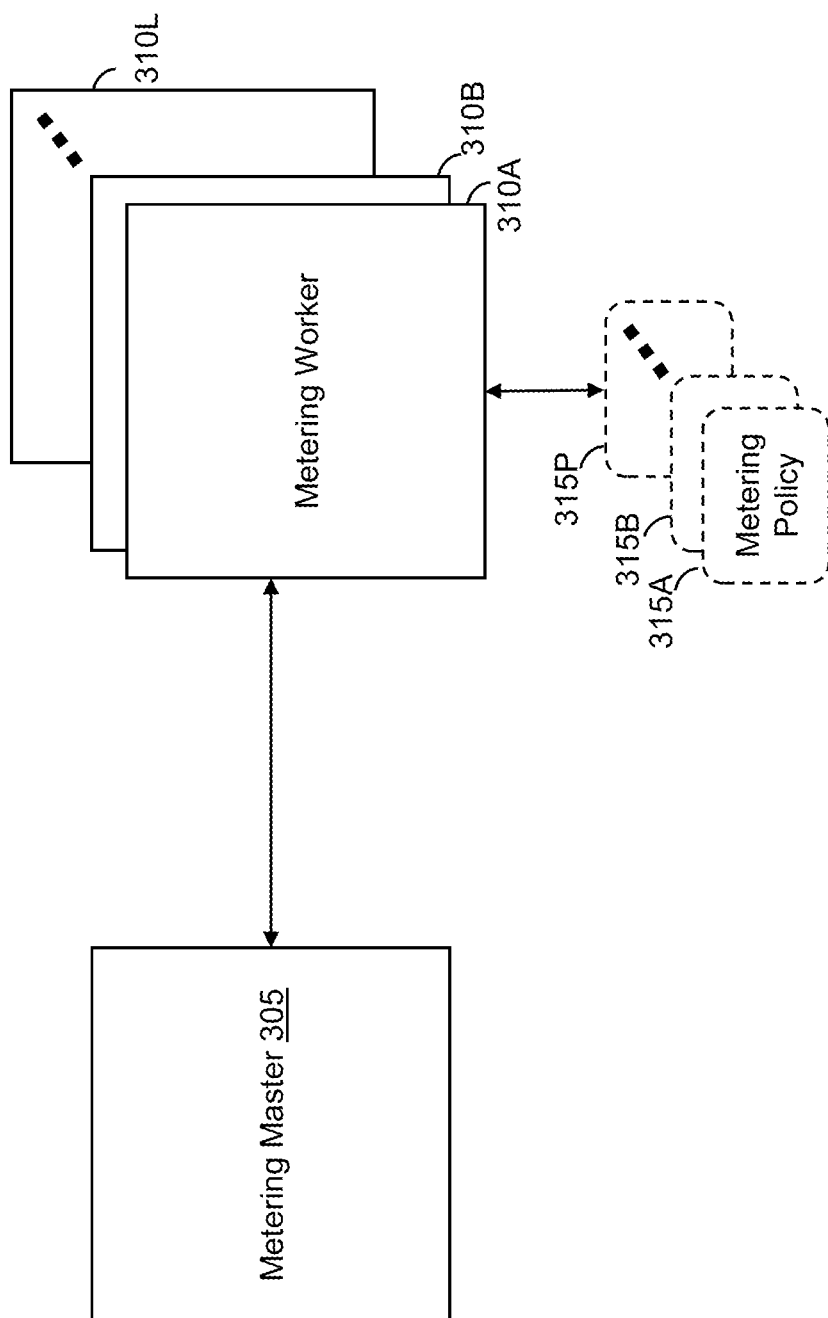

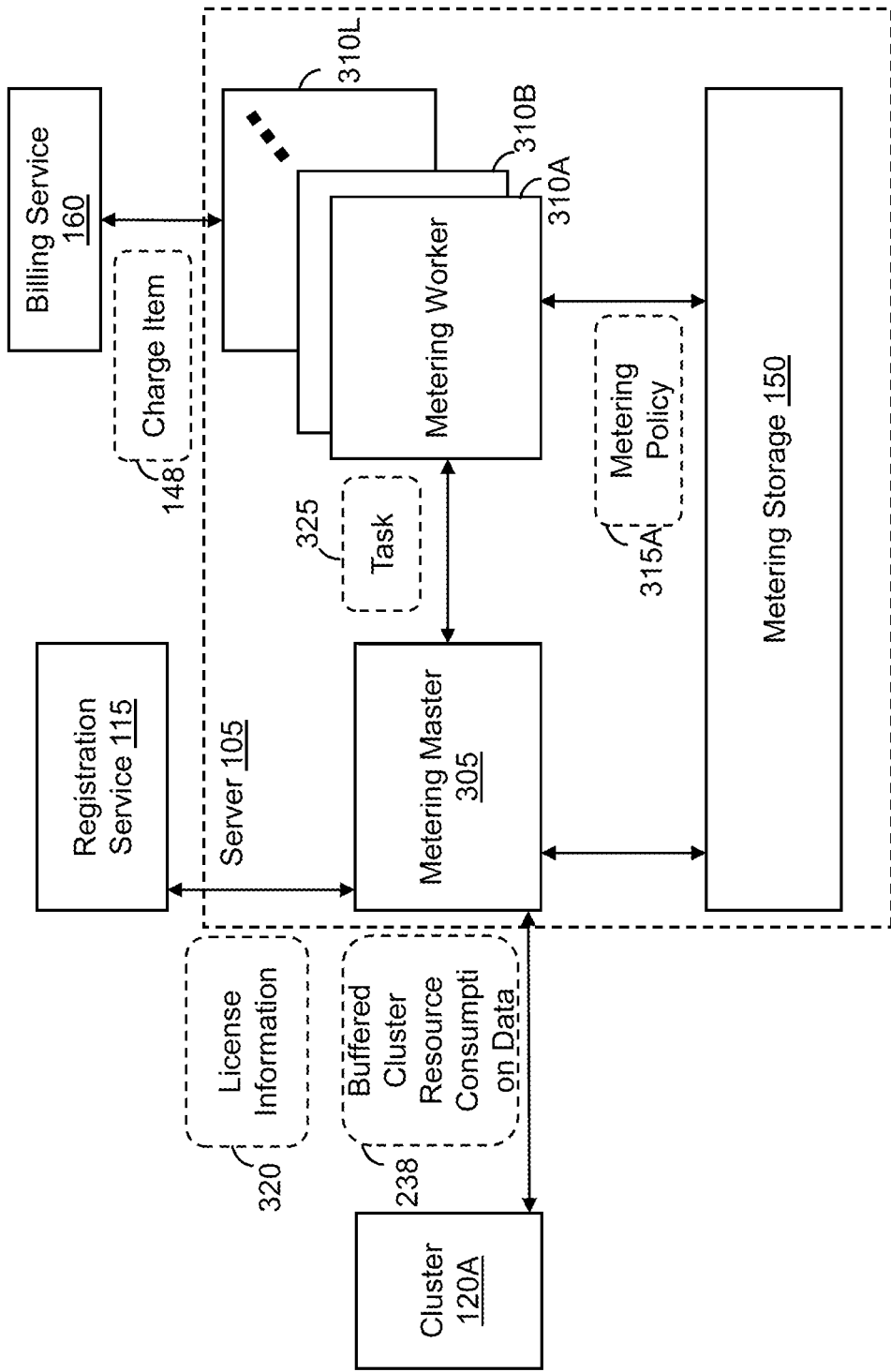

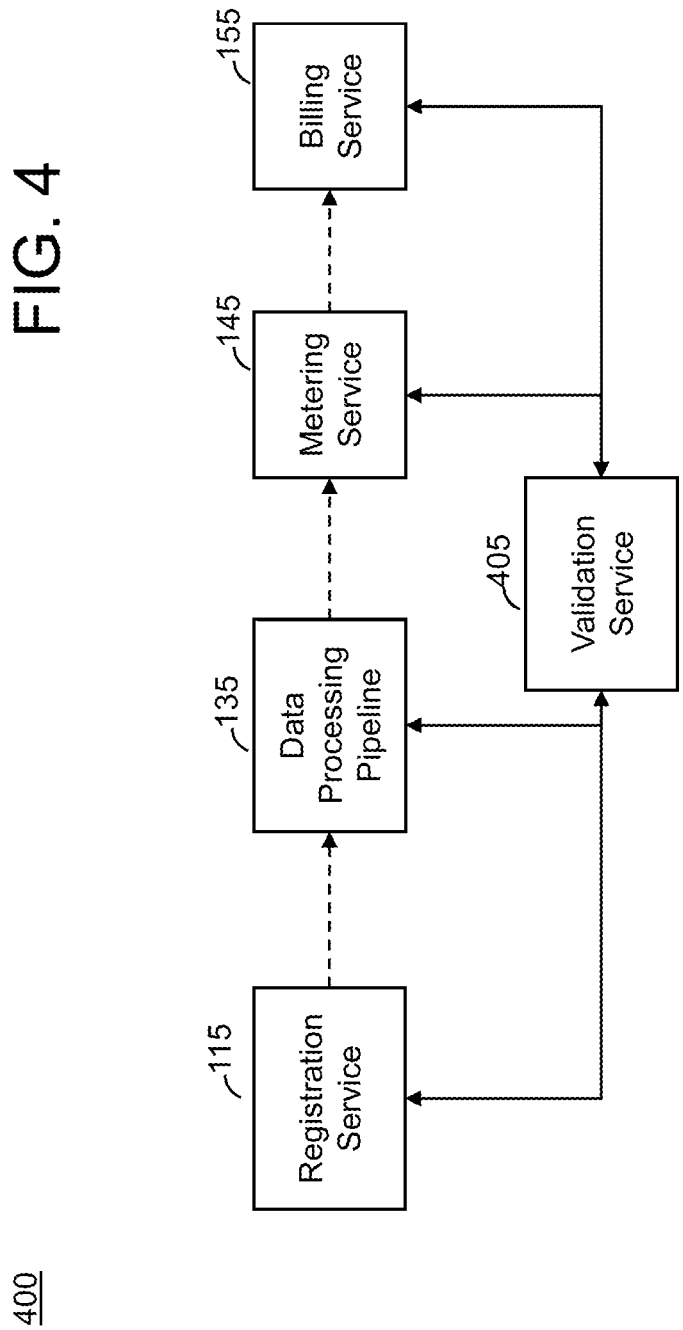

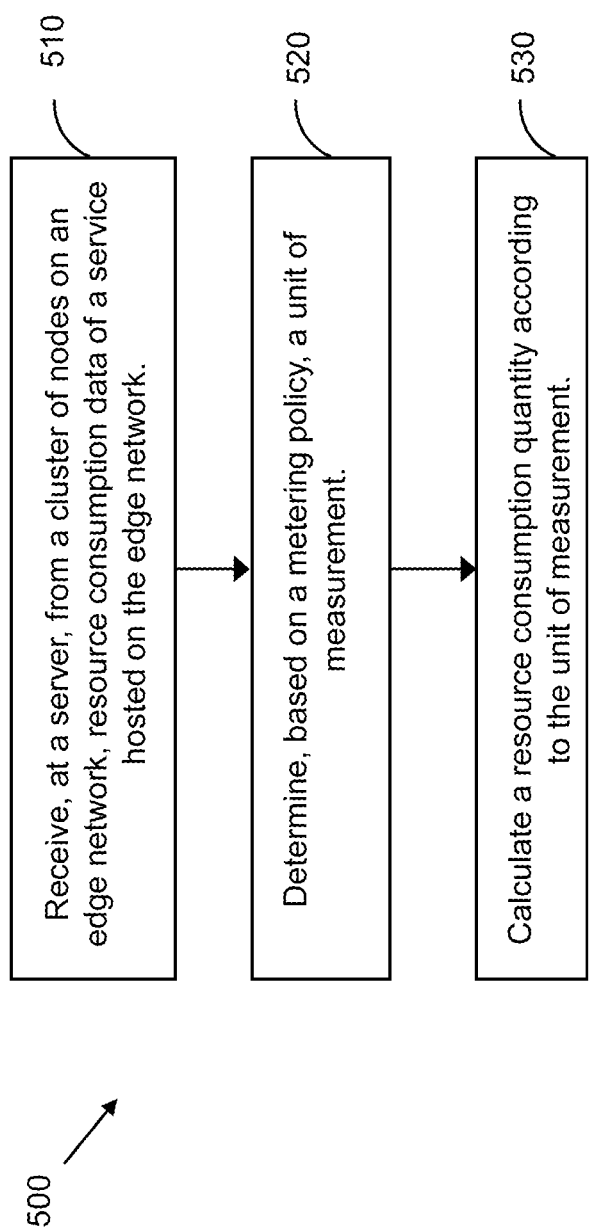

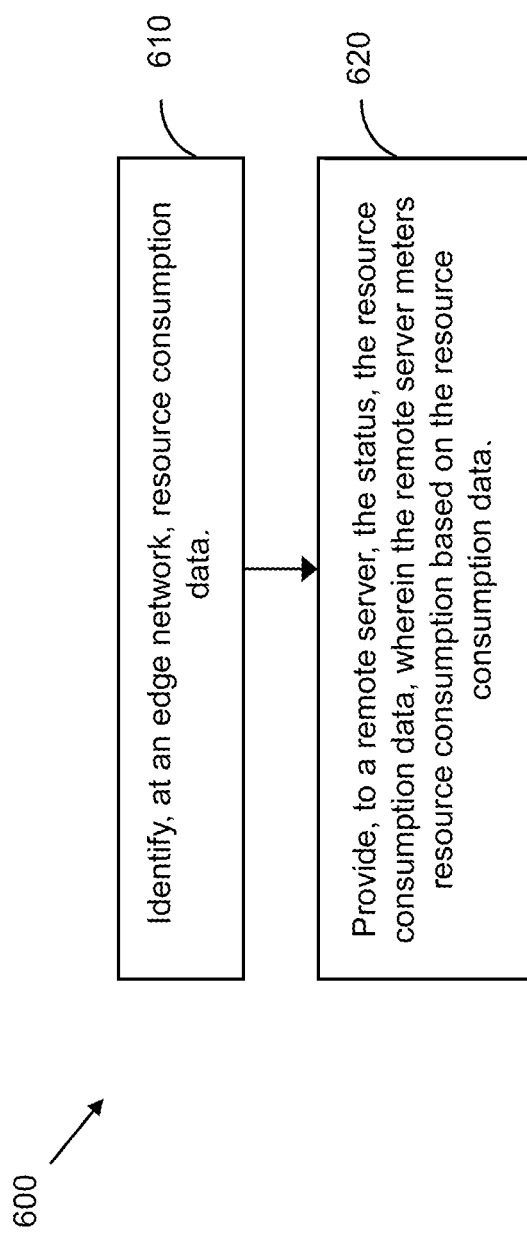

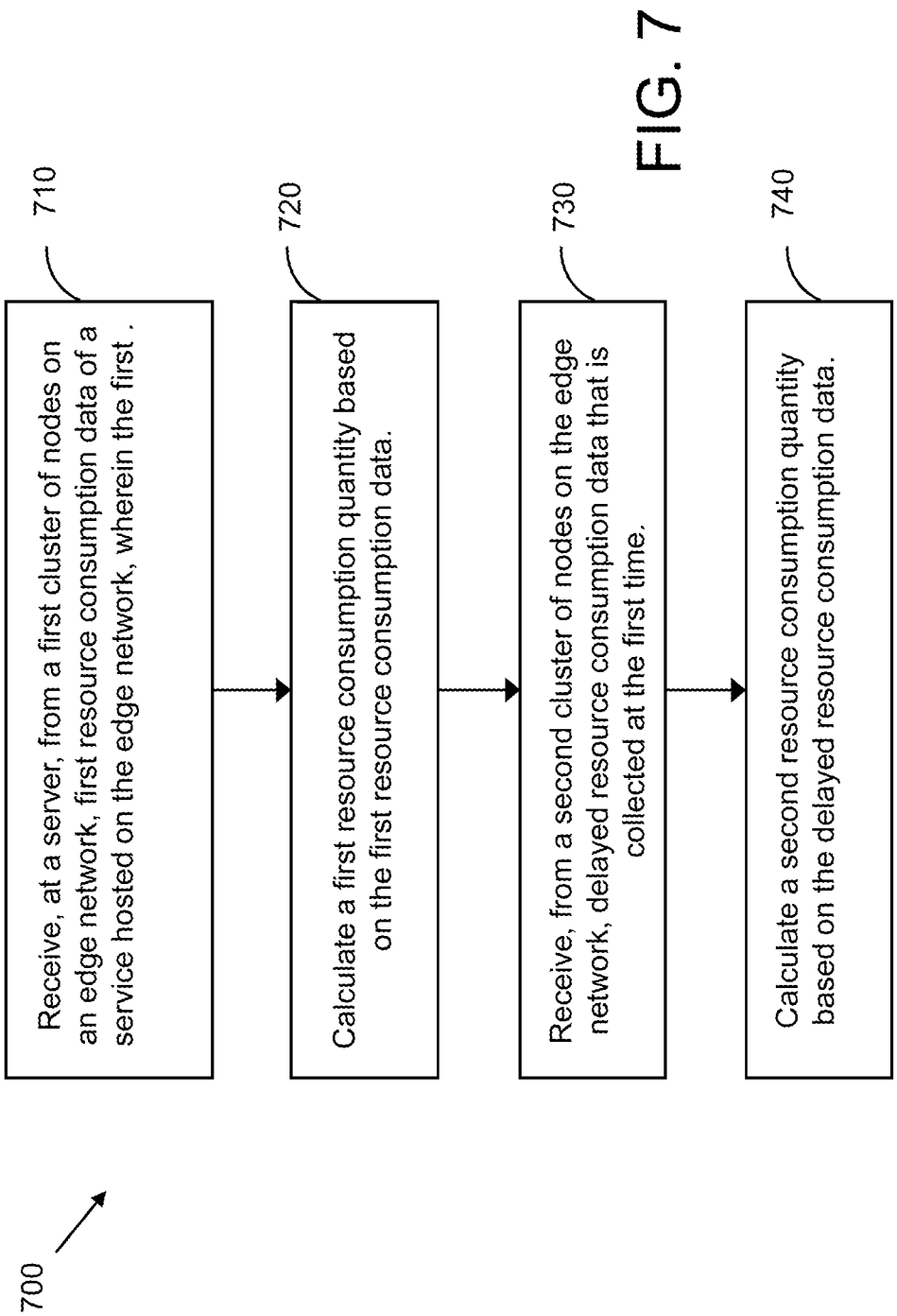

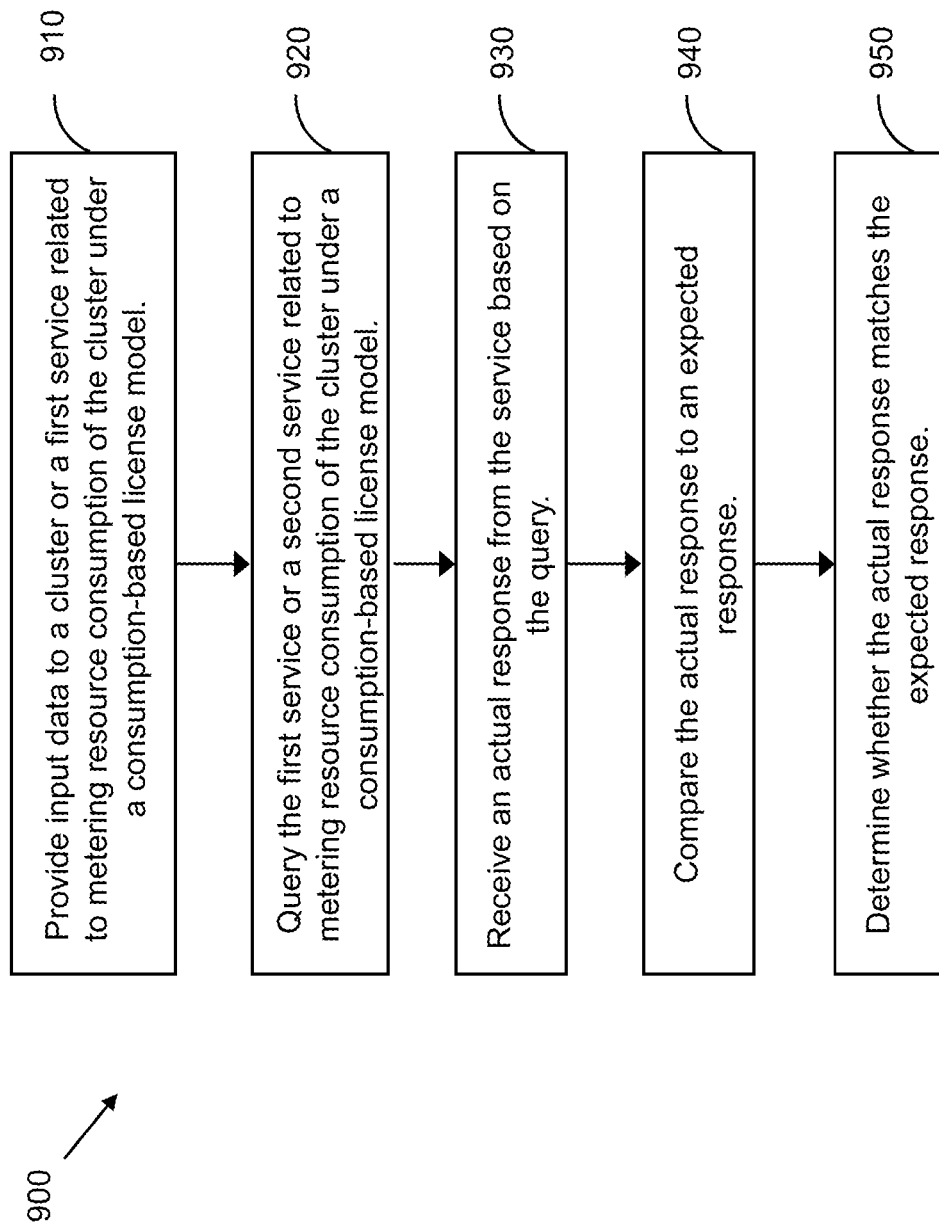

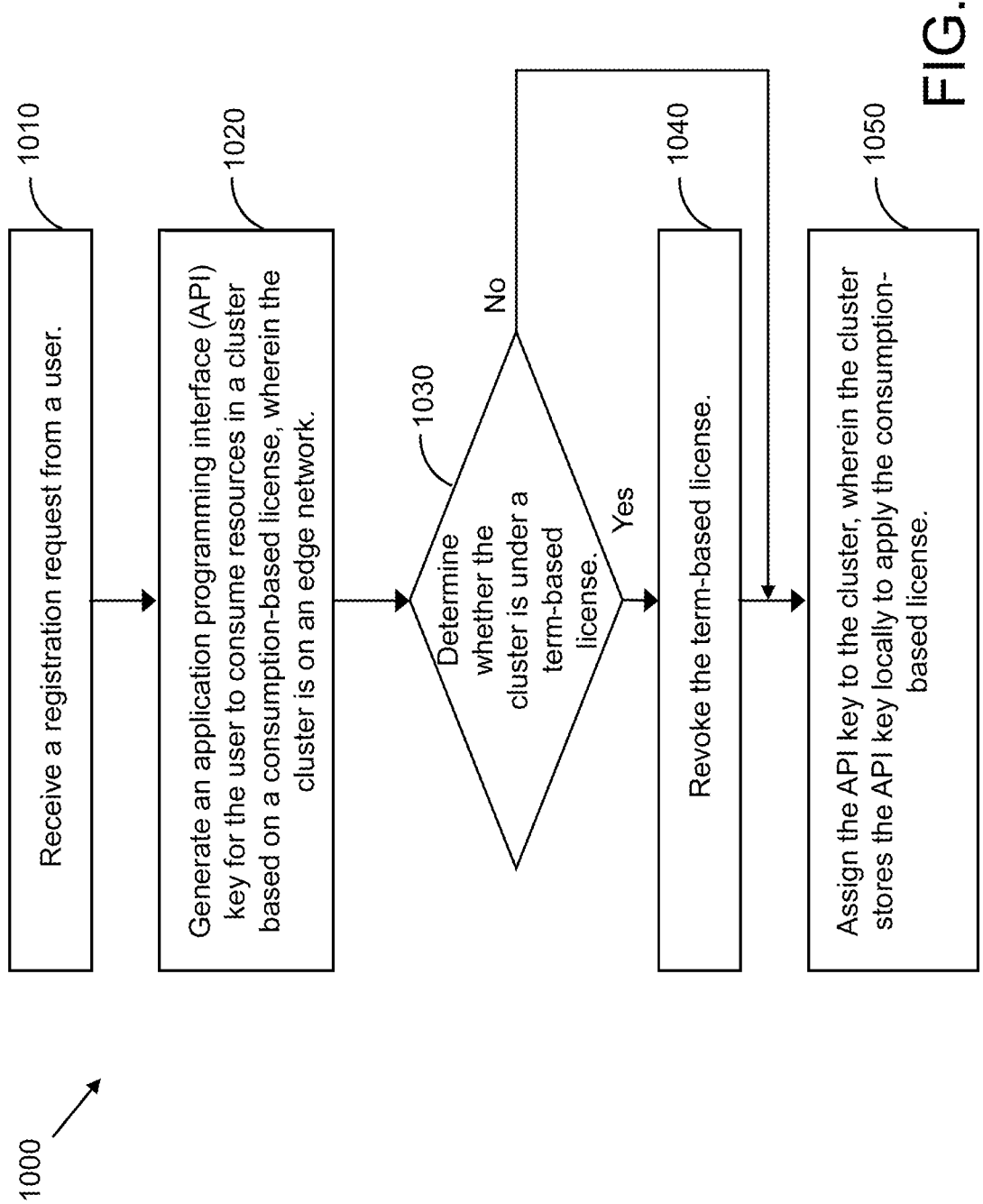

SYSTEM AND METHOD FOR COLLECTING CONSUMPTION

CROSS-REFERENCE TO RELATED APPLICATION

This application is related to and claims priority under 35 U.S. § 119(b) the Indian Patent Application No. 202141024135, filed May 31, 2021, titled "SYSTEM AND METHOD FOR SERVICE PROVIDER CONSUMPTION MODEL," the entire contents of which are incorporated herein by reference for all purposes.

BACKGROUND

Virtual, containerized, and microservice oriented computing systems are widely used in a variety of applications. The computing systems include one or more host machines running one or more entities (e.g., workloads, virtual machines, containers, and other entities) concurrently. Modern computing systems allow several operating systems and several software applications to be safely run at the same time, thereby increasing resource utilization and performance efficiency. However, the present-day computing systems have limitations due to their configuration and the way they operate.

SUMMARY

Various embodiments disclosed herein are related to a non-transitory computer readable storage medium. In some embodiments, the medium includes instructions stored thereon that, when executed by a processor, cause the processor to identify, at an edge network, resource consumption data including a status that indicates whether a service hosted on a cluster of nodes on the edge network is powered on, a type of a resource being consumed by the service, a quantity of the resource being consumed by the service, and a time stamp associated with the resource being consumed by the service and provide, to a remote server in communication with the edge network, the resource consumption data. In some embodiments, the remote server meters resource consumption based on the resource consumption data.

Various embodiments disclosed herein are related to an apparatus including a processor and a memory. In some embodiments, the memory includes programmed instructions that, when executed by the processor, cause the apparatus to identify, at an edge network, resource consumption data including a status that indicates whether a service hosted on a cluster of nodes on the edge network is powered on, a type of a resource being consumed by the service, a quantity of the resource being consumed by the service, and a time stamp associated with the resource being consumed by the service and provide, to a remote server in communication with the edge network, the resource consumption data. In some embodiments, the remote server meters resource consumption based on the resource consumption data.

Various embodiments disclosed herein are related to a computer-implemented method. In some embodiments, the method includes identifying, at an edge network, resource consumption data including a status that indicates whether a service hosted on a cluster of nodes on the edge network is powered on, a type of a resource being consumed by the service, a quantity of the resource being consumed by the service, and a time stamp associated with the resource being consumed by the service and providing, to a remote server in communication with the edge network, the resource consumption data. In some embodiments, the remote server meters resource consumption based on the resource consumption data.

The foregoing summary is illustrative only and is not intended to be in any way limiting. In addition to the illustrative aspects, embodiments, and features described above, further aspects, embodiments, and features will become apparent by reference to the following drawings and the detailed description.

BRIEF DESCRIPTION OF THE DRAWINGS

FIG. 1 is an example block diagram of a computing environment for metering consumption, in accordance with some embodiments of the present disclosure.

FIG. 2A is an example block diagram of the cluster of FIG. 1, in accordance with some embodiments of the present disclosure.

FIG. 3A is an example block diagram of the metering service of FIG. 1, in accordance with some embodiments of the present disclosure.

FIG. 3B is an example block diagram of a computing environment including the metering service of FIG. 1, in accordance with some embodiments of the present disclosure.

FIG. 4 is an example block diagram of a computing environment that includes a validation service, in accordance with some embodiments of the present disclosure.

FIG. 5 is an example flowchart of a method or metering resource consumption, in accordance with some embodiments of the present disclosure.

FIG. 6 is an example flowchart of a method for collecting resource consumption data, in accordance with some embodiments of the present disclosure.

FIG. 7 is an example flowchart of a method for updating resource consumption, in accordance with some embodiments of the present disclosure.

FIG. 9 is an example flowchart of a method for validating a metering system, in accordance with some embodiments of the present disclosure.

FIG. 10 is an example flowchart of a method for registering a cluster under the consumption-based license model, in accordance with some embodiments of the present disclosure.

Figure 2B:
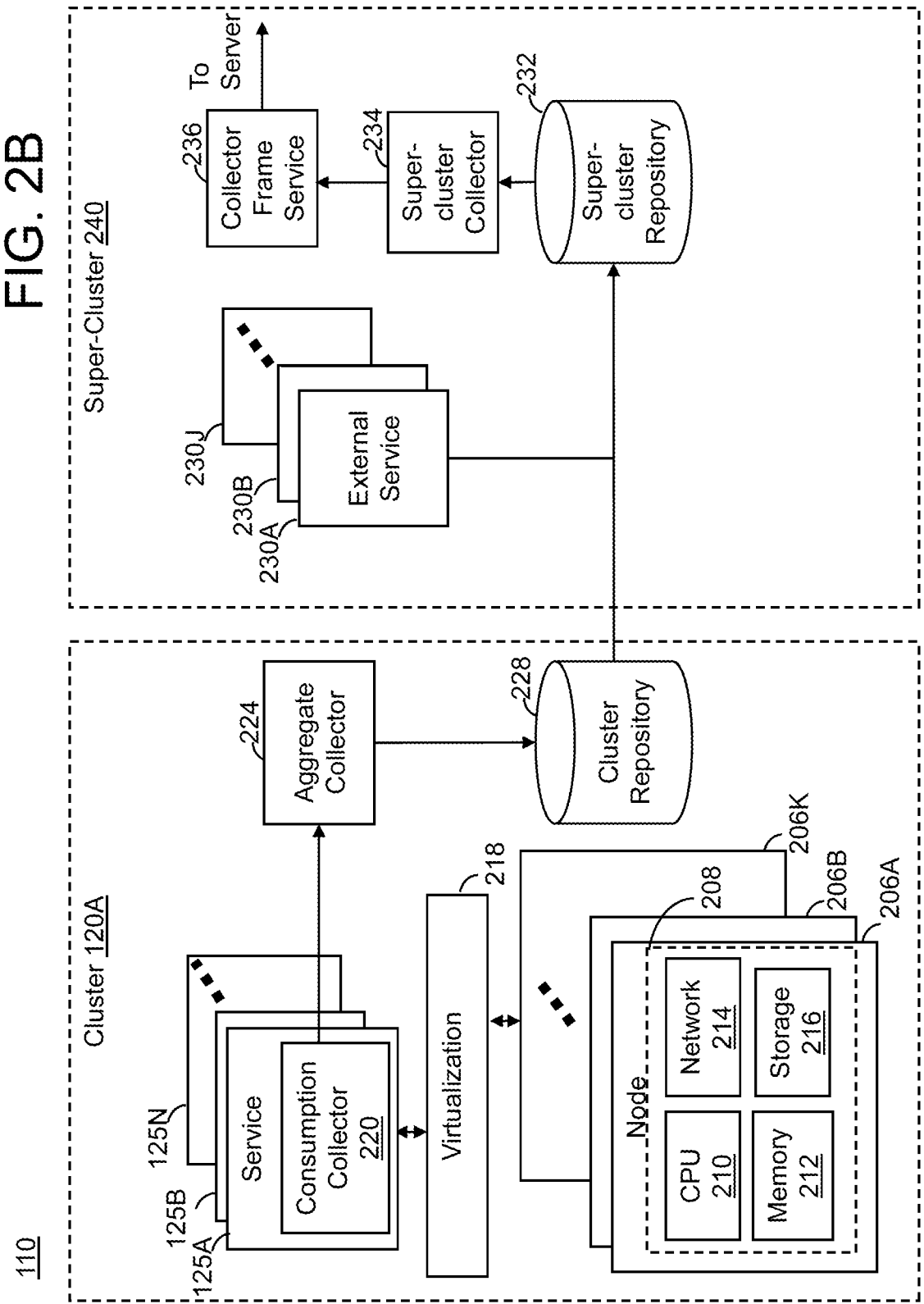
FIG. 2B is an example block diagram of the edge network of FIG. 1 that includes a super-cluster, in accordance with some embodiments of the present disclosure.

The foregoing and other features of the present disclosure will become apparent from the following description and appended claims, taken in conjunction with the accompanying drawings. Understanding that these drawings depict only several embodiments in accordance with the disclosure and are therefore, not to be considered limiting of its scope, the disclosure will be described with additional specificity and detail through use of the accompanying drawings.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

A consumption-based license model enables service providers to pay for consumption of infrastructure such as utilization or provisioning of resources for the service providers, which contrasts with a term-based license model in which the service providers pay a fixed amount for a time period regardless of how much resources they consume during that time period. In the consumption-based license model, the service providers can be metered for their consumption of resources/services in terms of networking, software as a service (Saas), platform as a service (PaaS), disaster recovery as a service (DraaS), infrastructure as a service (IaaS), or many other services.

In some embodiments, other on-premises based solutions meter or charge the resource consumption locally for that particular deployment (mostly based on selling terms & conditions). In some embodiments, other solutions only offer public cloud consumption-based modeling because providers of such solutions have not overcome challenges of collecting consumption data at edge networks (e.g., private data centers or other public clouds separate from the public cloud metering the consumption) and aggregating different substrates into a single solution. What is needed is a unification capability that deploys the solution irrespective of customer site location.

Disclosed herein are some embodiments of a system, an apparatus, and a method for gathering the consumed resources from edge nodes (e.g., hyperconverged infrastructure, or HCI, nodes that provide computing, storage, and networking resources) which are running in the customer's on-premises, residing in a data center across the globe, or running on top of public cloud infrastructure, and sending the gathered data to centralized location where a metering service processes the data as per business requirements.

In some embodiments, the system, apparatus, and method guarantee that irrespective of the underlying substrate, the metering model is capable enough to calculate the resource consumption uniformly and single invoice generation becomes very easy. In some embodiments, the system, apparatus, and method ensure that gathered utilization data at source clusters (irrespective of its physical geographic location) is sent to the centralized location where the metering service has logic to identify and calculate each cluster's consumption data independently. In some embodiments, having such capability gives the system flexibility to apply different metering policies as per the cluster's substrate. For example, the system can charge the customer's resource consumption differently if it runs on a different substrate, as the operating cost varies per substrate, but keep the invoice generation common with a single centralized billing and policy managing solution.

In some embodiments, other solutions collect, filter, and process resource consumption data at a centralized server. Such solutions can use up a prohibited amount of network bandwidth to transmit the resource consumption data from the edge nodes where the consumption is happening to the server where the collecting is happening. Moreover, such solutions can overburden processors of the server because of the processing required to format the resource consumption data into a form that can be metered and billed.

Disclosed herein are some embodiments of a system, an apparatus, and a method for collecting at the edge nodes. In some embodiments, the collectors periodically gather the utilization data from the cluster and send a compact version of the utilization data to the centralized distributed system for analysis. In some embodiments, there are dedicated collectors for each supported service in the cluster. In some embodiments, collectors collect the resource utilization data at fine-level (e.g., minute level) granularity. Advantageously, this can allow customers to capture the resource consumption on a (substantially) real-time basis.

In some embodiments, data gathering happens at source clusters and data analysis happens at common centralized location. Beneficially, keeping the data gathering and data analysis apart can provide the flexibility of maintaining them separately without having any tight dependency on each other. Moreover, by gathering at the source, an amount of processing at the centralized location can be reduced.

The edge network can have multiple node clusters running in one or multiple substrates and each node of the cluster can capture the resource utilization in a distributed form. If one of the nodes of the cluster fails at the source, then one node's data can be retrieved from another node of the cluster. Advantageously, in some embodiments, the system prevents no data loss and metering of the cluster won't get affected in this scenario.

In some embodiments, if sending to the centralized system fails due to any reason, then this data is automatically stored in the clusters locally. For example, if the cluster comes up from a temporary failure or downtime, then the server checks what was the last successful data sent timestamp and from where to continue. In some embodiments, in the event of a network communication failure, the collectors persist the resource utilization data locally on the cluster and when the network communication is restored, they send all the accumulated data to centralized servers for data analysis.

In some embodiments, the system, apparatus, and method provide the flexibility of updating the collectors independent of underlying substrate and software. In some embodiments, the collectors are a microservice and utilization data gathering logic can be modified, maintained, and upgraded separately, remotely, and/or automatically, depending on the customer's requirements. In some embodiments, no major maintenance cycle is required to upgrade the collectors.

In some embodiments, some nodes or clusters are affected by a temporary network outage and the system incorrectly meters and charges for that cluster for that network downtime. What is needed is a mechanism to correct such metering and billing errors.

Disclosed herein are some embodiments of a system, an apparatus, and a method for handling the under/over metering and charging use-cases effectively. To handle this case, in some embodiments, the metering service runs two tasks/check-pointers (e.g., a regular task and a fixer task). The metering service, in executing a regular task, can calculate the last one hour of consumption data received from source clusters. The fixer task can be executed later than the regular task (e.g., a day later, can be configured). In some embodiments, the metering service, in executing the fixer task, again calculates the consumption for the same time period for which the regular task was executed. In some embodiments, if the system finds a difference in the calculation, the system updates the previous calculation. Advantageously, the fixer task can reconcile utilization data for inadvertent network failure and for dark-sites, in which network availability is limited by design. Moreover, recalculating resource consumption can be used for consumption data auditing.

The metering service may face missing resource consumption data, delayed resource consumption data, and/or application programming interface (API) connectivity issues for registration or billing. What is needed is a mechanism for alerting a user or a site reliability engineer (SRE) of these issues so they can be addressed.

Disclosed herein are some embodiments of a system, an apparatus, and a method for alerting customers or SREs of data or API issues that affect the correctness of the calculated resource consumption and/or billable amount. In some embodiments, the system receives an indication that data is missing or delayed. In some embodiments, the system receives an indication that an API is not reachable. In some embodiments, the system alerts the customers or SREs based on one of the indications. Advantageously, based on the alert, the user or SRE can manually intervene, e.g., by configuring another fixer task so that the metering service can meter the delayed data.

In some embodiments, the consumption metering may encounter errors for certain use-cases. What is needed is a tool that can serve as a commercial-product for service providers to validate metering.

Disclosed herein are some embodiments of a system, an apparatus, and a method for validating metering for consumption-based offering for service providers. In some embodiments, the system validates full depth & breadth of the consumption-based licensing for service providers. In some embodiments, the system covers all the basic use-cases from an end-to-end perspective that any service provider would like to validate upon debugging product failure. Advantageously, validating metering can improve robustness of the system for various use-cases.

Other solutions require manually copying a cluster configuration from the cluster and manually uploading the cluster configuration onto a registration service/portal before acquiring a license key from the portal which is uploaded to the cluster. What is needed is a more automated approach for registering a cluster for a consumption-based license.

Disclosed herein are some embodiments of a system, an apparatus, and a method for registering in a more automated way. In some embodiments, the system generates an API key and assigns the API key to a cluster registered to the user. The license is applied when the API key is stored in the cluster. Advantageously, some embodiments skip the step of having to download the cluster configuration from the cluster and upload it to the registration service, resulting in a better user experience.

FIG. 1 illustrates an example block diagram of a computing environment 100 for metering consumption, in accordance with some embodiments of the present disclosure. The computing environment 100 includes a server 105. In some embodiments, the server 105 is a centralized server or a distributed server. The server 105 is coupled to (e.g., in communication with) an edge network 110. The server 105 processes information received from the edge network 110.

The computing environment 100 includes a registration service (e.g., a customer portal) 115. The registration service 115 can be hosted by the server 105 or a server/node/VM/container separate from the server 105. The registration service 115 registers a user (e.g., a tenant, customer, service provider, service provider's end user, etc.) or a device associated with the user for consuming cluster resources on a consumption-based license model. The user can request consumption-based registration/licensing of new clusters or existing clusters (e.g., transitioning from another license model such as a term-based license model).

In some embodiments wherein new clusters are being requested, the registration request includes one or more of a number of clusters, a number of nodes on each cluster, types of services to be registered (e.g., in each of the clusters), a number of super-clusters (e.g., multi-cluster management services), etc., from the user. In some embodiments, the registration request includes types of services to be registered and automatically determines a number of clusters and a number of nodes based on the service requirement. In some embodiments, the registration service 115 registers the services in the respective nodes and clusters in accordance with the request. In some embodiments, the registration service 115 assigns a user ID (e.g., tenant ID, user account, tenant account) for the user associated with the cluster and/or a cluster ID for each of the clusters to be registered. In some embodiments, the clusters to be registered are dedicated to that user (e.g., cluster per tenant) whereas in other embodiments, the clusters to be deployed are shared with other users (e.g., multi-tenant clusters).

In some embodiments wherein a user is transitioning to the consumption-based license, the registration service 115 receives, from the user, the user ID corresponding to the user and/or each of the cluster IDs associated with the (respective) clusters corresponding to the user under another license model. In other embodiments of a transitioning user, the registration service 115 receives the cluster information (e.g., number of clusters, number of nodes, types of services, etc.) and assigns the user ID and/or the cluster IDs. In some embodiments, the user has pending/not-yet-used credit with the term-based license that is transferred to the consumption-based license. The credit may be used to pay for resource consumption equal to a value of the credit.

In some embodiments, in response to receiving the registration request, the registration service 115 generates a token (e.g., an application programming interface (API) key, a file) e.g., for the user to consume resources based on the consumption-based license (model). In some embodiments, the token is per-user or per-cluster. In some embodiments, the registration service 115 assigns the token to the registered cluster (e.g., the cluster 120A on the edge network 110) associated with the user. In some embodiments, the user copies the API key from the registration service and stores the API key in the registered.

In some embodiments, the token includes one or more of a user ID, a cluster ID, or a policy ID. In some embodiments, the registration service 115 assigns a token for each cluster and each super-cluster. The token may be stored in memory or storage in the server 105 or the network. In some embodiments, by storing the token, the license/token is applied to the cluster where the token is stored. In some embodiments, once the token is applied, the server 105 can start receiving collected consumption data from each cluster and metering consumption of services on each cluster and the registration service 115 can pull information from the registered cluster. After the license is applied, the resource consumption data (e.g., input to metering) and/or the metering data (e.g., output from metering) includes the user ID that allows matching resource consumption/metering data with a correct user. In some embodiments, matching the data to a user eliminates or reduces a potential of mismatch of data and a user.

In some embodiments, after the license is applied, the user (e.g., via the registration service 115 or a UI of the cluster) can scale up or scale down the cluster configuration without having to change or move the token or increase/decrease the number of tokens. For example, the user adds nodes or removes nodes from the cluster; the user changes the operating system, or aspects thereof, (e.g., usage tier) from a first type (e.g., without additional features) to a second type (e.g., with additional features); the user increases or decreases an amount of memory/storage (e.g., non-volatile memory such as flash which can include solid-state drive (SSD) or NVM express (NVMe)), a number of file servers or stored data, a number of object stores, a number of nodes protected by a security security, or a number of VMs to be used by a service.

In some embodiments, the registration service 115 de-registers a user (e.g., upon request of the user). In some embodiments, de-registering a user includes stopping metering of services that on the cluster, stopping sending of metered data, removing the token from the cluster (e.g., user can transition to a term-based license), and marking the cluster as inactive.

The edge network 110 is or includes one or more of an on-premises data center, a distributed data center (e.g., a third-party data center, a data center that serves an enterprise), a private cloud, or a public cloud (e.g., different from a public cloud that hosts the server 105). The edge network 110 includes a number of clusters 120A, 120B, ..., 120M. The cluster 120A includes a number of services 125A, 125B, ..., 125N. Each of the number of services 125A, 125B, ..., 125N can be a different service. For example, the service 125A may include one or more of an operating system/kernel/core service, a user interface, database provisioning, lifecycle management, orchestration/automation, networking security (e.g., micro-segmentation of the network), a (e.g., software-defined) file server, etc. In some embodiments, each of the services 125A-125N include, correspond to, or are coupled to a respective collector 130 that collects data/metadata such as resource utilization/consumption from each of the services 125A-125N. In other embodiments, the services 125A-125N are coupled to a single collector.

Each of the services 125A-125N may be running/executed on a virtual machine (VM) or container. Although the disclosure focuses on the cluster 120A and the service 125A, any of the clusters 120B-120M and any of the services 125B-125N are within the scope of the disclosure. Although FIG. 1 shows three clusters 120A-120N and three services 125A-125N, any number of clusters and services are within the scope of the disclosure.

FIG. 2A is a more detailed, example block diagram of the cluster 120A of FIG. 1, in accordance with some embodiments of the present disclosure. The cluster 120A includes the number of services 125A-125N. Each service consumes resources from nodes. As an example, the service 125A consumes resources from the nodes 206A, 206B, ..., 206K. Each node includes resources. As an example, the node 206A includes resources 208 which include CPU (cores) 210, memory 212, NICs (and other networking resources) 214, and storage 216. The resources 208 are provided to the service 125A via the virtualization (layer, e.g., hypervisor or container runtime) 218. In some embodiments, the node 206A is referred to as a hyperconverged infrastructure (HCI) node because the node 206A provides the CPU cores 210, the memory 212, the NICs 214, and the storage 216 resources, as opposed to a three-tier architecture which segregates different types of resources into different nodes/servers/etc. In some embodiments, the cluster 120A is referred to as an HCI cluster.

Each of the services 125A-125N includes a consumption collector 220. The consumption collector 220 collects service resource consumption data 222 (e.g., information, files, statistics, metadata, etc.). In some embodiments, the service resource consumption data 222 indicates resource consumption of the respective service (e.g., that the consumption collector 220 is running on or corresponds to). In some embodiments, the service resource consumption data 222 includes an identifier of the resource, a time stamp (indicating a time), and a consumption amount corresponding to the resource. For example, the consumption data can include "VM1 10:30 AM 4 GB." The time, the amount, and the identifier may be referred to as a consumption data point. In some embodiments, the service resource consumption data 222 includes a plurality of consumption data points. In some embodiments, the service resource consumption data 222 includes a user ID of the user consuming the resources. In some embodiments, the service resource consumption data 222 includes a state of the respective service (e.g., powered on or off). In some embodiments, the consumption collector 220 is similar to the collector 130 of FIG. 1. Each of the services 125A-125N may include other collectors such as log collectors, configuration collectors, health collectors, etc.

In some embodiments, the cluster 120A includes an aggregate collector 224 that is in communication with each consumption collector 220. In some embodiments, the aggregate collector 224 aggregates the service resource consumption data 222 of all of the consumption collectors to provide a cluster resource consumption data 226 which indicates resource consumption at the cluster level. In some embodiments, the aggregate collector 224 specifies/defines a frequency of collection and an amount/limit of data to aggregate into one collection/set of data. In some embodiments, the aggregate collector 224 retains service resource consumption data 222 and filters out some or all other types of data (e.g., cluster/service health data).

In some embodiments, the cluster 120A includes a cluster repository 228. The aggregate collector 224 stores the cluster resource consumption data 226 in the cluster repository 228. In some embodiments, the cluster repository 228 is in-memory. In some embodiments, the cluster repository 228 is, or includes, one or more of log-based storage or a relational database.

In some embodiments, the cluster 120A includes a collector frame service (CFS) 236. The CFS 236 may receive the cluster resource consumption data 226 from the cluster repository 228 and provides a second (e.g., buffered) cluster resource consumption data 238 to the server 105. In some embodiments, the buffered cluster resource consumption data 238 is similar to the cluster resource consumption data 226. In some embodiments, the buffered cluster resource consumption data 238 is formatted in a way that can be interpreted by the server 105. In some embodiments, the buffered cluster resource consumption data 238 includes additional consumption data such as consumption data of services external (e.g., running on top of) the cluster 120A. The CFS 236 may perform various other functions such as instructing one or more of the collectors 220 or 224 to change a configuration, identifying false positives, add one or modify rules to correct for errors and false positives, provide or resolve conflicts of override configuration rules, etc. In some embodiments, the collector configuration includes one or more of what information to collect, where to collect the information from, how to collect the information, how granular to collect this information, when to collect this information, how often to collect, and when and where to push the information.

In some embodiments, the server 105 determines that the cluster 120A (e.g., or a service, e.g., the service 125A, or a node hosting the service, e.g., the node 206A hosting the service 125A) is powered off if the cluster 120A is temporary or permanently failing/down, which can be referred to as a source failure, or the user has configured the cluster 120 to be powered down. In some embodiments, the server 105 determines that the cluster 120A is powered on if communication (e.g., a network, a link, etc.) between the cluster 120A and the server 105 is down/terminates/interrupts or if the cluster 120A is in a dark-site state (e.g., intentionally not communicating with the server 105 for privacy purposes, etc.). In some embodiments, during the outage, each consumption collector 220 persists/stores the service resource consumption data 222 of the respective service locally in the cluster repository 228 and the CFS 236 sends the buffered cluster resource consumption data 238 (e.g., the service resource consumption data 222 for the current time period and for the time period in which there was in an outage) after communication with the server 105 reestablishes/resumes/is restored.

In some embodiments, the server 105 determines that the failure is a source failure by (a) not receiving the buffered cluster resource consumption data 238 (e.g., within/for a certain time period), but (b) receiving indication that communication with the edge network 110 is active/uninterrupted (e.g., receiving a success code/response/acknowledgment in response to a health/polling/status query/request). In some embodiments, the server 105 determines that the failure is a network failure (e.g., a failure of a communication network in between the edge network 110 and the server 105) by (a) not receiving the buffered cluster resource consumption data 238 (e.g., within/for a certain time period), and (b) receiving indication that communication with the edge network 110 is inactive/interrupted (e.g., receiving a failure code/response/non-acknowledgement in response to the health query). In some embodiments, the server 105 determines a duration of no data being (successfully) sent (e.g., based on timestamps of data successfully being sent).

FIG. 2B is a more detailed example block diagram of the edge network 110 of FIG. 1 that includes a super-cluster 240, in accordance with some embodiments of the present disclosure. Although only one cluster is shown, the edge network 110 can include two or more clusters that are coupled to the super-cluster 240. The super-cluster 240 aggregates data from one or more clusters such as the cluster 120A and one or more external services 230A, 230B, . . . 230J. In some embodiments, the external services 230A-230J are services that are associated with the user and the consumption license but that are not included in any of the clusters communicating with the super-cluster 240. In some embodiments, the external services 230A-230J are running on third-party infrastructure. In some embodiments, each of the external services 230A-230J includes one or more collectors such as the consumption collector 220. In some embodiments, each of the external services 230A-230J are similar to a respective one of the services 125A-125N of FIG. 1.

The super-cluster 240 includes a super-cluster repository 232. The super-cluster repository 232 receives the cluster resource consumption data 226 from each data repository such as the cluster repository 228 and from the external services 230A-230L. In some embodiments, the cluster resource consumption data 226 is received at a predetermined interval.

In embodiments corresponding to FIG. 2B, the super-cluster 240 includes a super-cluster collector 234 and the CFS 236 (and the CFS 236 is omitted from the cluster 120A). The super-cluster collector 234 fetches the aggregated data from the super-cluster repository 232. The super-cluster collector 234 may perform similar functions as the aggregate collector 224. In some embodiments, the super-cluster collector 234 provides the collected data to the CFS 236. The CFS 236 may generate data similar to the buffered cluster resource consumption data 238 based on the aggregate data received from the super-cluster collector 234.

Returning to FIG. 1, the server 105 includes a data processing pipeline 135 that receives the data collected by each collector such as the collector 130. In some embodiments, the data processing pipeline 135 performs schema validation, converts (e.g., aggregates, formats) the buffered cluster resource consumption data 238 received from different devices and services into a detailed metering item 142. In some embodiments, the detailed metering item 142 includes one or more of a user ID, a resource/entity ID, a resource consumption amount/quantity (e.g., at a cluster level), a region, a policy ID, a duration, supported attributes of the cluster or service therein, a service that consumed the resource, or a (power) state of the service. In some embodiments, the detailed metering item 142 is a Javascript object notation (JSON) stream. In some embodiments, the data processing pipeline 135 persists/stores the detailed metering item 142 in a data repository (e.g., data lake, database, etc.) 140. In some embodiments, the server 105 includes the data repository 140.

The server 105 includes a metering service 145 in communication with the data repository 140. In some embodiments, the metering service 145 receives the detailed metering item 142 from the data repository 140. In some embodiments, the metering service 145 converts/transforms/formats the detailed metering item 142 into a charge item 148. In some embodiments, the charge item 148 is at a user level. The metering service 145 may aggregate consumption of different services 125A-125N or different clusters 120A-120M to a user level of consumption. In some embodiments, the charge item 148 includes one or more of the user ID, a duration (e.g., a start time and a stop time), a unit of measurement (UoM), a quantity (e.g., in terms of the UoM), or a region. The UoM may include one or more of a resource type (e.g., one or more resources such as central processing unit (CPU) cores (e.g., VMs, containers), storage (e.g., disks), or memory) or a time granularity/unit/interval for quantifying resource consumption (e.g., minute, hour, day). In some embodiments, the charge item 148 is calculated or formatted according to one or more metering policies, which is discussed below in more detail.

In some embodiments, the server 105 includes a metering storage (e.g., database) 150 in communication with the metering service 145. In some embodiments, the metering service 145 stores the output state (e.g., the charge item 148) and a detailed split up of usage (e.g., the detailed metering item 142) in the metering storage 150. In some embodiments, the metering service 145 pulls user license information (e.g., a list of the clusters that the user registered, metering policies, etc.) from the registration service 115 periodically and persists the user license information into the metering storage 150. In some embodiments, the metering service 145 persists metering policies in the metering storage 150. In some embodiments, the metering service 145 persists a metadata state into the metering storage 150 (e.g., for bootstrapping after restarts and for debuggability, etc.). In some embodiments, the metadata state which is captured includes a task/user execution state along with relevant checkpoints with respect to task execution, each task's state (success/failure, execution latency etc.).

FIG. 3A is a more detailed example block diagram of the metering service 145, in accordance with some embodiments of the present disclosure. In some embodiments, the metering service 145 is a (e.g., containerized) microservice. The metering service 145 includes a metering master (e.g., master) 305 and a number of metering workers (e.g., workers) 310A, 310B, . . . , 310L. In some embodiments, the metering master 305 and the metering workers 310A-310L are microservices or threads of a single microservice. In some embodiments, instances of the metering master 305 and the metering workers 310A-310L can be deployed in individual groups/pods including shared storage, networking, and instructions for how to run the metering master 305 and the metering workers 310A-310L such as an image of each of the metering master 305 and the metering workers 310A-310L and ports to use. In some embodiments, the metering master 305 and the metering workers 310A-310L are deployed as VMs or containers using a VM deployment platform or container deployment platform, respectively. Each service can scale up and down according to a workload and achieve a high-level of reliability.

In some embodiments, the metering master 305 schedules tasks for the workers 310A-310L. The metering master 305 can be responsible for bootstrapping the metering state (e.g., a list of users, checkpoints, policies) from a persistent store upon start. In some embodiments, the metering master 305 provides/fronts public-facing metering APIs for retrieving the metering output state (e.g., the charge item 148, a user/task metadata state, detailed records/charge items for a user, detailed metering item 142).

In some embodiments, the metering master 305 pulls (e.g., retrieves, fetches) user license/registration information from the registration service 115 (e.g., which users are registered under the consumption-based license models) periodically (e.g., by polling the registration service 115) and persists the user license information into a metering database. The registration service 115 exposes an API to query a current list of registered users. The metering master 305 can use a hypertext transfer protocol (http) request with a proper user/bearer token to communicate with the registration service 115 API.

Each of the metering workers 310A-310L is responsible for executing one or more tasks. As an example, the metering worker 310A executes one or more metering tasks. In some embodiments, the metering worker 310A pulls one or more metering tasks from the metering master 305 and calculates the resource consumption for the given unit of measure (UoM), the user, and the duration/number, based on a selected metering policy of one or more metering policies 315A, 315B, . . . , 314P. In some embodiments, the metering worker 310A uses a policy ID provided in the metering task to retrieve a metering policy from the metering storage 150 (e.g., by finding the metering policy or an address thereof at an index equal to the policy ID or hash of the policy ID). In some embodiments, the metering worker 310A determines the UoM from contents of the retrieved metering policy. The metering worker 310A can process tasks in a number of concurrent threads for execution (e.g., as a command-line flag). Each of the metering workers 310A-310L can scale independently by having multiple processes. Although the disclosure focuses on the metering worker 310A, any of the metering workers 310B-310L are within the scope of the disclosure. Although FIG. 3A shows three metering workers 310A-310L, any number of metering workers are within the scope of the disclosure.

In some embodiments, a metering task includes/encapsulates one or more of user information (e.g., user ID), a policy ID, Start/End time, a type of task, a created timestamp, and once executed, also holds info for the status and task execution time. In some embodiments, the metering task can include information from the detailed metering item 142. In some embodiments, the metering worker 310A executes/runs a regular task (e.g., a pointer), which includes computing metering for the given user and duration to provide the charge item 148. The regular task may be near the time (e.g., within one hour) the resource consumption data is used. The metering worker 310A (or the metering master 305) may save/buffer resource consumption data for a certain amount of time (e.g., one hour). In some embodiments, the regular task includes a time stamp that indicates up to what time metering has been performed on the resource consumption data.

In some embodiments, the metering worker 310A executes a fixer task, which runs (e.g., based on a command-line flag such as a glfag) a certain time (e.g., hours, days) after a respective regular task and computes the metering again. The fixer tasks can serve as a safeguarding mechanism by accounting for late arrival of input data (e.g., input data that was collected before a corresponding regular task but not sent to the server 105 until after the corresponding regular task) and outage of the one of the components of the edge network 110, the server 105, or a network coupling the edge network 110 and the server 105.

In some embodiments, a time delta/delay between executing the regular task and the fixer task is preconfigured (e.g., by the server 105 or the user). In some embodiments, the time delta between the regular tasks and the fixer task is set/adjusted/modified (manually) by the user. In some embodiments, the fixer task can be executed more than once for a given user and duration (e.g., based on an alert, which is discussed in further detail below).

Since there are multiple users, multiple time slices (monthly, daily, hourly) and different kinds of tasks (e.g., regular and fixer), the metering master 305 can prioritize tasks. In some embodiments, the scheduler first schedules the regular tasks (e.g., in an order of highest granularity to lowest granularity, such as monthly, daily, hourly) before scheduling to fixer tasks. In some embodiments, the task execution is idempotent (e.g., any task from any time can be executed again without corrupting any of the internal metadata state or output, which are both persisted in a metering database, or a packet sent to a billing service).

In some embodiments, the metering policy 315A includes user-defined rules that specify how to meter a given resource/entity for a given one or more users. In some embodiments, upon defining/receiving a policy, the computing environment 100 (e.g., the registration service 115, the metering service 145) applies the metering policy 315A to the applicable users. In some embodiments, the metering policy 315A includes the UoM (e.g., a resource to be metered, time ranges for the computation), attribute names and properties (e.g., which attributes to be considered for that type of resource and other specific properties on how to use that attribute), specific calculation methods to be applied, time ranges for reporting, complementary and discount services, and other miscellaneous support attributes. In some embodiments, the metering worker 310A receives the metering policy 315A as part of the task or receives it separately from the metering master 305 or a database.

Although the disclosure focuses on the metering policy 315A, any of the metering policies 315B-315P are within the scope of the disclosure. Although FIG. 3A shows three metering policies 315A-315P, any number of metering policies are within the scope of the disclosure.

In some embodiments, the UoM (e.g., a charge item, a granularity, a time granularity, a combination of a granularity and a resource type, a number of resources, etc.) varies based on a service used. For example, a first UoM and a second UoM for an operating system service are number of CPU core hours and number of (flash) memory hours, a third UoM for a user interface (UI) service is a number of nodes, a fourth UoM for an orchestration/automation service is a number of VMs, and a fifth UoM for a file server and for an object store is an amount of stored Tebibytes (TiB). In some embodiments, if the resource/UoM is or corresponds to a compute resource, the metering worker 310A computes the resource consumption only for when the service using the resource is powered on, whereas if the resource/UoM is or corresponds to a storage resource, the metering worker 310A computes the resource consumption regardless of whether the service using the resource is powered on or powered off.

FIG. 3B is an example block diagram of a computing environment 300, in accordance with some embodiments of the present disclosure. In some embodiments, the computing environment 300 is similar to the computing environment 100 of FIG. 1. However, for the purpose of showing how the metering service 145 interacts with other components, the computing environment 300 illustrates more details in some aspects and omits details in other aspects with respect to the computing environment 100 of FIG. 1.

In some embodiments, the metering master 305 receives license information 320 from the registration service (e.g., clusters and/or services registered, metering policies). The license information 320 may be sent in snapshots. The metering master 305 may poll the registration service 115 at a certain interval (e.g., 5 minutes) to receive the license information 320. In some embodiments, the cluster 120A provides the buffered cluster resource consumption data 238, including the resource consumption of services at a cluster level and the policy ID, to the server 105. In some embodiments, the data processing pipeline 135 converts the buffered cluster resource consumption data 238 into the detailed metering item 142 and provides the detailed metering item 142, including the resource consumption of services at a cluster level and the policy ID, to the metering master 305. In some embodiments, the metering master 305 polls the cluster 120A at a certain interval, while in some other embodiments, the cluster 120A provides the detailed metering item 142 at an certain interval or in response to a change in resource consumption without being polled. In some embodiments, the metering master 305 stores the license information 320 and the detailed metering item 142 in the metering storage 150.

In some embodiments, the metering master 305 sends a task 325, including instructions for executing the task 325, to a metering worker 310A. In some embodiments, the metering worker 310A uses the policy ID to retrieve the metering policy 315A from the metering storage 150. In some embodiments, the metering worker 310A executes the task 325 according to the instructions in the task 325. In some embodiments, the metering worker 310A computes or generates the charge item 148 based on the task 325 and the metering policy 315A. For example, the metering policy 315A specifies to compute a number of VM-hours and the task 325 specifies that cluster 120A consumed 2 VMs for 30 minutes, 4 VMs for 30 minutes and 5 VMs for 1 hour. In the example, the metering worker 310A computes the VM-hours, e.g., by normalizing each VM-hour data point to one hour and including the weight, multiplying the weight by the VM-hour data point, and adding the product together. In some embodiments, the metering worker 310A provides the charge item 148 to the billing service 160.

Returning to FIG. 1, the server 105 includes an alerts service 155. In some embodiments, the alerts service 155 determines or receives indication (e.g., from the metering service 145) of one or more issues. For example, the metering service 145 persists a metric that indicates whether there is an issue (e.g., dataMissing=True/False) to the metering storage 150 and, if dataMissing=True, the metering service 145 provides an event to the alerts service 155. In some embodiments, an issue is detected with respect to the entire cluster (e.g., if at least one service sends data, no issue is detected). In other embodiments, the issue can be detected with respect to resources, services, or policies.

In some embodiments, the issue includes one of data delay, data missing, or API connectivity issues. Data delay can be when the cluster 120A sends buffered cluster resource consumption data 238 after a regular task but within a predetermined delay threshold (e.g., 12 hours after a task). Data missing can be when the cluster 120A does not send buffered cluster resource consumption data 238 within the predetermined delay threshold. In some embodiments, such as if the data delay or data missing is with respect to a regular task, the user can adjust the time that a fixer task is to run. In some embodiments, the user schedules another fixer task. The fixer task or the other fixer task can calculate and send an updated charge item such as the charge item 148. In some embodiments, a site reliability engineer (SRE) manually calculates the updated charge item and posts it in the billing service 160.

API connectivity issues can be when the metering service 145 cannot connect to the registration service 115 API to receive (e.g., a latest snapshot of) the license information 320 from the registration service 115. In some embodiments, the metering service 145 polls the registration service 115 once per a certain interval. In some embodiments, if the metering service 145 does not receive the license information 320 from the registration service 115 after a predetermined number of intervals, the alerts service 155 receives an indication of an API connectivity issue.

API connectivity issues can be when the metering service 145 cannot connect to the billing service 160 API to provide the charge item 148 to the billing service 160. In some embodiments, if posting the charge item 148 to the billing service 160 fails and/or a metering checkpoint fails, the alerts service 155 receives an indication of an API connectivity issue. In some embodiments, if the billing service 160 does not receive a request to post a charge item 148 for greater than a predetermined threshold for posting billing, the alerts service 155 receives an indication of an API connectivity issue. In some embodiments, a metering SRE or developer fixes/unblocks the connection that is causing the API connectivity issue.

In some embodiments, the alerts service 155 alerts/notifies a user or a site reliability engineer (SRE) of the issue. In some embodiments, the alerts service 155 generates or provides a corrective action. In some embodiments, the corrective action includes that the SRE manually fixes the issue, recalculates the charge item 148, or tells the user what is wrong with the cluster. In some embodiments, the corrective action includes that the metering service 145 double-check a charge item 148 associated with the issue. If the issue is resolved within a predetermined resolution time, the metering service 145 can automatically updates the charge item 148. If the issue is resolved after the predetermined resolution time, the SRE can manually recalculate and update the charge item 148.

The computing environment includes a billing service 160 in communication with the metering service 145. In some embodiments, once a task execution has been successfully completed, the metering service 145 provides/posts the charge item 148 (e.g., a packet, an output packet) to the billing service 160. In some embodiments, the charge item 148 includes one or more of a user ID, a resource consumption quantity/value, a UoM, and a start and end date. In some embodiments, the charge item 148 is provided by or corresponding to execution of the respective task. In some embodiments, the billing service 160 multiplies the resource consumption quantity by a rate to determine a billable amount. In some embodiments, the rate is based on the metering policy 315A. In some embodiments, the billing service 160 consolidates the formatted consumption data received from the metering service 145 into one data structure (e.g., spreadsheet, invoice, bill). In some embodiments, the billing service 160 sends, displays, or otherwise makes available the charge item 148 and the billable amount to the use (e.g., once per a certain interval). In some embodiments, the charge item 148 and the billable amount are displayed or otherwise represented versus time (e.g., time segments, time intervals).

FIG. 4 is an example block diagram of a computing environment 400 that includes a validation service 405, in accordance with some embodiments of the present disclosure. In some embodiments, the computing environment 400 is similar to the computing environment 100 of FIG. 1. However, for the purpose of showing how the validation service 405 interacts with other components, the computing environment 300 illustrates more details in some aspects and omits details in other aspects with respect to the computing environment 100 of FIG. 1.

In some embodiments, the validation service 405 validates operations of one or more services related to metering resource consumption in a consumption-based license model (e.g., the registration service 115, the data processing pipeline 135, the metering service 145, or the billing service 160). Generally, the validation service 405 provides input data to one of the services, queries the one of the services, receives an actual response from the service based on the query, compares an actual response of the one of the services to an expected response (based on the input data), and validates the one of the services if the actual response matches the expected response. For example, the validation service 405 configures a cluster in the registration service 115 and queries the registration service 115 to determine if the configured cluster is registered.

In another example, the validation service 405 assigns a workload to a registered cluster (e.g., the cluster 120A), wherein the validation service 405 knows a priori an amount of resources consumed, e.g., an amount of storage the workload is to consume (based on a size of the workload/file) or an amount of time that the CPU and/or memory the workload is to consume (based on a capacity of the CPU and/or memory and an amount of CPU and/or memory that is to complete the workload). In some embodiments, the validation service 405 queries the data processing pipeline 135, the metering service 145, or the billing service 160 to retrieve the amount of resources consumed. For example, the validation service 405 queries one or more of the data processing pipeline 135 to retrieve the buffered cluster resource consumption data 238 or the detailed metering item 142, the metering service 145 to retrieve the detailed metering item 142 or the charge item 148, or the billing service 160 to retrieve the charge item 148 or the billable amount.

Referring now to FIG. 5, a flowchart of an example method 500 for metering resource consumption is illustrated, in accordance with some embodiments of the present disclosure. The method 500 can be performed by one or more systems, components, or modules depicted in FIGS. 1-4, including, for example, the server 105, the metering service 145, etc. In some embodiments, instructions for performing the method 500 are executed by a processor included in, or associated with, the one or more systems, components, or modules and stored in a non-transitory computer readable storage medium included in, or associated with, the one or more systems, components, or modules. Additional, fewer, or different operations may be performed in the method 500 depending on the embodiment.

According to the method 500, a processor (e.g., the metering service 145 or a processor therein) receives, at a server (e.g., the server 105), from a cluster (e.g., the cluster 120A) on an edge network (e.g., the edge network 110) in communication with the server, resource consumption data (e.g., the buffered cluster resource consumption data 238, the detailed metering item 142, etc.) of a service (e.g., the service 125A) hosted on the edge network (at operation 510). In some embodiments, the resource consumption data includes one or more data points, and each data point includes a resource identifier, a time stamp, and a resource quantity. In some embodiments, the server is a first public cloud and the edge network or the cluster of nodes is, or is a portion of, one or more of an on-premises data center, a distributed (e.g., third-party) data center, a private cloud, or a second public cloud different from the first public cloud, or a combination thereof. In some embodiments, the resource consumption data is at a cluster level (e.g., takes into account resources consumed for the entire cluster).

In some embodiments, the processor receives, from a second cluster on the edge network, second resource consumption data of a service hosted on the edge network. In some embodiments, the cluster of nodes is on one type of platform and the second cluster of nodes is on another type of platform. For example, the cluster of nodes is on an on-premises data center and the second cluster of nodes is on a private cloud. Other examples of combinations of platforms are within the scope of the disclosure. In some embodiments, a user is registered with both of the cluster of nodes and the second cluster of nodes. In some embodiments, the processor generates the resource consumption quantity at least based on both of the resource consumption data and the second resource consumption data.

In some embodiments, the processor determines, based on one or more of a metering policy (e.g., the metering policy 315A) or the resource consumption data, a unit of measurement (at operation 520). In some embodiments, the unit of measurement includes a time granularity or a type of resource. In some embodiments, the processor calculates a resource consumption quantity (e.g., a charge item 148) according to the unit of measurement (at operation 530). In some embodiments, the resource consumption quantity is used to determine an amount (in dollars) to charge a user that is registered, or otherwise associated, with the cluster and any other clusters. In some embodiments, the resource consumption quantity is at a user level (e.g., takes into account resources consumed by the user regardless of the cluster).

In some embodiments, the processor determines cluster of nodes by retrieving license information associated with a user registered with the cluster of nodes from a registration service via a hypertext transfer protocol (HTTP) application programing interface (API). In some embodiments, the processor provides the resource consumption quantity to a billing service via an HTTP API.

In some aspects, a non-transitory computer readable storage medium includes instructions stored thereon that, when executed by a processor, cause the processor to receive, at a server, from a cluster of nodes on an edge network in communication with the server, a resource consumption data of a service hosted on the edge network; determine, based on a metering policy, a unit of measurement; and calculate a resource consumption quantity according to the unit of measurement.

In some aspects, the resource consumption data includes one or more data points, and each data point of the one or more data points includes a resource identifier, a time stamp, and a resource quantity. In some aspects, the resource consumption quantity is used to determine an amount to charge a user registered with the cluster of nodes.

In some aspects, the server is a first public cloud and the edge network is one or more of an on-premises data center, a distributed data center, or a second public cloud different from the first public cloud. In some aspects, the unit of measurement includes one or more of a time granularity or a type of resource.

In some aspects, the resource consumption data indicates resource consumption at a cluster level and the resource consumption quantity indicates resource consumption at a user level. In some aspects, instructions stored on the storage medium that, when executed by a processor, further cause the processor to determine the cluster of nodes by retrieving license information associated with a user registered with the cluster of nodes from a registration service via a hypertext transfer protocol (HTTP) application programing interface (API).

In some aspects, an apparatus includes a processor and a memory, wherein the memory includes programmed instructions that, when executed by the processor, cause the apparatus to receive, at a server, from a cluster of nodes on an edge network in communication with the server, a resource consumption data of a service hosted on the edge network; determine, based on a metering policy, a unit of measurement; and calculate a resource consumption quantity according to the unit of measurement.

In some aspects, the memory includes programmed instructions that, when executed by the processor, further cause the apparatus to determine the cluster of nodes by retrieving license information associated with a user registered with the cluster of nodes from a registration service via a hypertext transfer protocol (HTTP) application programing interface (API).

In some aspects, a computer-implemented method includes receiving, at a server, from a cluster of nodes on an edge network in communication with the server, a resource consumption data of a service hosted on the edge network; determining, based on a metering policy, a unit of measurement; and calculating a resource consumption quantity according to the unit of measurement.

In some aspects, the method further includes determining the cluster of nodes by retrieving license information associated with a user registered with the cluster of nodes from a registration service via a hypertext transfer protocol (HTTP) application programing interface (API).

Referring now to FIG. 6, a flowchart of an example method 600 for collecting resource consumption data is illustrated, in accordance with some embodiments of the present disclosure. The method 600 can be performed by one or more systems, components, or modules depicted in FIGS. 1-4, including, for example, the collector 130, the aggregate collector 224, the collector frame service 236, etc. In some embodiments, instructions for performing the method 600 are executed by a processor included in, or associated with, the one or more systems, components, or modules and stored in a non-transitory computer readable storage medium included in, or associated with, the one or more systems, components, or modules. Additional, fewer, or different operations may be performed in the method 600 depending on the embodiment. One or more operations of the method 600 can be combined with one or more operations of the method 500.

According to the method 600, a processor (e.g., the collector 130 or a processor therein) identifies, at an edge network (e.g., the edge network 110), resource consumption data (e.g., service resource consumption data 222, cluster resource consumption data 226, buffered cluster resource consumption data 238) (at operation 610). The resource consumption data may be associated with a service, a cluster, a super-cluster, etc. In some embodiments, resource consumption data of one service can be combined with resource consumption data of another service (e.g., in one transmission packet or multi-part transmission) and provided together to the remote server. In some embodiments, the resource consumption data includes a status that indicates whether a service (e.g., the service 125A) hosted on a cluster (e.g., the cluster 120A) of nodes (e.g., the nodes 206A-206K) on the edge network is powered on. In some embodiments, the resource consumption data includes one or more of a type of resource being consumed by the service, a quantity of the resource being consumed by the service, or a timestamp associated with the resource being consumed by the service. In some embodiments, the resource consumption data is collected, identified, and provided in accordance with a collector configuration (e.g., collected at a predetermined interval, granularity, etc.).

In some embodiments, the processor provides, to a remote server (e.g., the server 105) in communication with the edge network, the resource consumption data (at operation 620). In some embodiments, the processor receives an indication that communication with the remote server is interrupted. In some embodiments, the processor receives an indication that communication with the remote server is reestablished/restored. In some embodiments, the processor provides, in response to receiving the indication that communication is reestablished, the status, the type of resource, the quantity of the resource, and the resource consumption data.

In some embodiments, the remote server determines that the service is powered off in response to receiving an indication that communication with the edge network is active (e.g., the server can send a first health query to the edge network and can receive a failure code in response), and not receiving the resource consumption data for a predetermined time period. The server can determine compare a time difference between a most recent resource consumption data and a second most recent resource consumption data to determine if the time difference is greater than the predetermined time period.

In some aspects, a non-transitory computer readable storage medium includes instructions stored thereon that, when executed by a processor, cause the processor to identify, at an edge network, resource consumption data including a status that indicates whether a service hosted on a cluster of nodes on the edge network is powered on, a type of a resource being consumed by the service, a quantity of the resource being consumed by the service, and a time stamp associated with the resource being consumed by the service; and provide, to a remote server in communication with the edge network, the resource consumption data, wherein the remote server meters resource consumption based on the resource consumption data. In some aspects, the indication whether the service hosted on the cluster of nodes on the edge network is powered on includes a second indication of whether the edge network is in a dark-site mode.

In some aspects, instructions stored on the storage medium that, when executed by a processor, further cause the processor to receive an indication that communication with the remote server is interrupted. In some aspects, instructions stored on the storage medium that, when executed by a processor, further cause the processor to receive a second indication that communication with the remote server is restored; and provide, in response to receiving the second indication that communication is restored, the resource consumption data to the remote server.

In some aspects, the remote server determines that the service is powered off in response to: receiving an indication that communication with the edge network is active; and not receiving the resource consumption data for a predetermined time period.

In some aspects, instructions stored on the storage medium that, when executed by a processor, further cause the processor to combine the resource consumption data of the service hosted on the cluster of nodes with second resource consumption data of a second service external to the cluster of nodes. In some aspects, instructions stored on the storage medium that, when executed by a processor, further cause the processor to collect the resource consumption data periodically in accordance with a collector configuration.

In some aspects, an apparatus includes a processor and a memory, wherein the memory includes programmed instructions that, when executed by the processor, cause the apparatus to identify, at an edge network, resource consumption data including a status that indicates whether a service hosted on a cluster of nodes on the edge network is powered on, a type of a resource being consumed by the service, a quantity of the resource being consumed by the service, and a time stamp associated with the resource being consumed by the service; and provide, to a remote server in communication with the edge network, the resource consumption data, wherein the remote server meters resource consumption based on the resource consumption data.

In some aspects, the memory includes programmed instructions that, when executed by the processor, further cause the apparatus to receive an indication that communication with the remote server is interrupted. In some aspects, the memory includes programmed instructions that, when executed by the processor, further cause the apparatus to receive a second indication that communication with the remote server is restored; and provide, in response to receiving the second indication that communication is restored, the resource consumption data to the remote server.

In some aspects, the memory includes programmed instructions that, when executed by the processor, further cause the apparatus to combine the resource consumption data of the service hosted on the cluster of nodes with second resource consumption data of a second service external to the cluster of nodes. In some aspects, the memory includes programmed instructions stored thereon that, when executed by a processor, further cause the processor to collect the resource consumption data periodically in accordance with a collector configuration.

In some aspects, a computer-implemented method includes identifying, at an edge network, resource consumption data including a status that indicates whether a service hosted on a cluster of nodes on the edge network is powered on, a type of a resource being consumed by the service, a quantity of the resource being consumed by the service, and a time stamp associated with the resource being consumed by the service; and providing, to a remote server in communication with the edge network, the resource consumption data, wherein the remote server meters resource consumption based on the resource consumption data.

In some aspects, the method includes receiving an indication that communication with the remote server is interrupted. In some aspects, the method includes receiving a second indication that communication with the remote server is restored; and providing, in response to receiving the second indication that communication is restored, the resource consumption data to the remote server.

In some aspects, the method includes combining the resource consumption data of the service hosted on the cluster of nodes with second resource consumption data of a second service external to the cluster of nodes. In some aspects, the method includes collecting the resource consumption data periodically in accordance with a collector configuration.

Referring now to FIG. 7, a flowchart of an example method 700 for updating resource consumption is illustrated, in accordance with some embodiments of the present disclosure. The method 700 can be performed by one or more systems, components, or modules depicted in FIGS. 1-4, including, for example, the server 105, the metering service 145, the billing service 160, etc. In some embodiments, instructions for performing the method 700 are executed by a processor included in, or associated with, the one or more systems, components, or modules and stored in a non-transitory computer readable storage medium included in, or associated with, the one or more systems, components, or modules. Additional, fewer, or different operations may be performed in the method 700 depending on the embodiment. One or more operations of the method 700 can be combined with one or more operations of one or more of the methods 500-600.

According to the method 700, a processor (e.g., the metering service 145 or a processor therein) receives, at a server (e.g., the server 105), from a first cluster (e.g., the cluster 120A) of nodes (e.g., the nodes 206A-206K) on an edge network (e.g., the edge network 110) in communication with the server, first resource consumption data (e.g., the buffered cluster resource consumption data 238, the detailed metering item 142, etc.) of a service (e.g., the service 125A) hosted on the edge network (at operation 710). In some embodiments, the first resource consumption data is collected at a first time. In some embodiments, the first cluster is registered (e.g., by the registration service 115) to a user under a consumption-based license model in which the user is to pay based on a quantity of resources consumed by the first cluster and other clusters registered to the user.

In some embodiments, the processor calculates a first resource consumption quantity (e.g., a charge item 148) based on the first resource consumption data (at operation 720). In some embodiments, the processor sends the first resource consumption quantity to a billing service (e.g., the billing service 160). In some embodiments, the billing service one of overcharges or undercharges a user registered to the first cluster of nodes and the second cluster of nodes.

In some embodiments, the processor receives, from the a second cluster of nodes (or a node in the first cluster of nodes) on the edge network, delayed resource consumption (e.g., another instance of the buffered cluster resource consumption data 238, another instance of the detailed metering item 142, etc.) data that is collected at the first time (at operation 730). In some embodiments, at least a part of the delayed resource consumption data was not available to be received when the first resource consumption data was received (e.g., due to a source failure of the second cluster of nodes or a node of the first cluster of nodes, a network failure, or the second cluster of nodes or a node of the first cluster of nodes operating in dark-site mode). In some embodiments, the delayed resource consumption data includes the first resource consumption data (e.g., the resource consumption data of the first cluster of nodes that were available to be received when the first resource consumption data was received). In some embodiments, the delayed resource consumption data only includes resource consumption data that was not available to be received when the first resource consumption data was received. In some embodiments, the second cluster is registered to the user under the consumption-based license model.

In some embodiments, the processor calculates a second resource consumption quantity based on the delayed resource consumption data (at operation 740). In some embodiments, the processor sends the second resource consumption quantity to a billing service (e.g., the billing service 160). In some embodiments, the processor or the billing service compares the first resource consumption quantity to the second resource consumption quantity to determine that the second resource consumption quantity is different than the first resource consumption quantity. In some embodiments, the second resource consumption quantity in response to determining that the second resource consumption quantity being different than the first resource consumption quantity.

In some embodiments, the billing service replaces the first resource consumption quantity with the second resource consumption quantity, or otherwise updates the first resource consumption quantity to include the second resource consumption quantity. In response, the billing service does the replacement/update in response to determining that the second resource consumption quantity being different than the first resource consumption quantity. In some embodiments, the second resource consumption quantity includes the resources consumed by the first cluster at the first time (e.g., the first resource consumption quantity and additional resource consumed by the first cluster at the first time). In some embodiments, the billing service provides (e.g., presents, displays), to the user, the first resource consumption quantity and the second resource consumption quantity. In some embodiments, in response to the billing service receiving the second resource consumption quantity, the billing service charges a user registered to the first cluster of nodes and the second cluster of nodes a correct amount based on the resources used by the user and the resource consumption license model for the user.

In some embodiments, the processor pre-configures a time delta between calculating the first resource consumption quantity and calculating the second resource consumption quantity. In some embodiments, the processor adjusts the preconfigured time delta between calculating the first resource consumption quantity and calculating the second resource consumption quantity in response to a user request.

In some aspects, a non-transitory computer readable storage medium includes instructions stored thereon that, when executed by a processor, cause the processor to receive, at a server, from a first cluster of nodes on an edge network in communication with the server, first resource consumption data of a first service hosted on the edge network, wherein the first resource consumption data is collected at a first time; calculate a first resource consumption quantity based on the first resource consumption data; receive, from a second cluster of nodes on the edge network, delayed resource consumption data of a second service hosted on the edge network, wherein the delayed resource consumption data collected at the first time; and calculate a second resource consumption quantity based on the delayed resource consumption data.

In some aspects, the medium includes instructions stored thereon that, when executed by a processor, further cause the processor to send the first resource consumption quantity to a billing service; and send the second resource consumption quantity to the billing service, wherein the billing service updates the first resource consumption quantity to include the second resource consumption quantity. In some aspects, the medium includes instructions stored thereon that, when executed by a processor, further cause the processor to determine that the second resource consumption quantity is different than the first resource consumption quantity; and send the second resource consumption quantity in response to determining that the second resource consumption quantity being different than the first resource consumption quantity.

In some aspects, the medium includes instructions stored thereon that, when executed by a processor, further cause the processor to preconfigure a time delta between calculating the first resource consumption quantity and calculating the second resource consumption quantity. In some aspects, the medium includes instructions stored thereon that, when executed by a processor, further cause the processor to adjust the preconfigured time delta between calculating the first resource consumption quantity and calculating the second resource consumption quantity in response to a user request.

In some aspects, the delayed resource consumption data was not available to be received at a same time as the first resource consumption data due to an outage. In some aspects, the outage is one of a source failure of the second cluster of nodes, a network failure of a communication network between the server and the edge network, or the second cluster of nodes operating as a dark-site.

In some aspects, an apparatus includes a processor and a memory. In some embodiments, the memory includes programmed instructions that, when executed by the processor, cause the apparatus to receive, at a server, from a first cluster of nodes on an edge network in communication with the server, first resource consumption data of a first service hosted on the edge network, wherein the first resource consumption data is collected at a first time; calculate a first resource consumption quantity based on the first resource consumption data; receive, from a second cluster of nodes on the edge network, delayed resource consumption data of a second service hosted on the edge network, wherein the delayed resource consumption data collected at the first time; and calculate a second resource consumption quantity based on the delayed resource consumption data.

In some aspects, the memory includes programmed instructions that, when executed by the processor, further cause the apparatus to: send the first resource consumption quantity to a billing service; and send the second resource consumption quantity to the billing service, wherein the billing service updates the first resource consumption quantity to include the second resource consumption quantity. In some aspects, the memory includes programmed instructions that, when executed by the processor, further cause the apparatus to: determine that the second resource consumption quantity is different than the first resource consumption quantity; and send the second resource consumption quantity in response to determining that the second resource consumption quantity being different than the first resource consumption quantity.

In some aspects, the memory includes programmed instructions that, when executed by the processor, further cause the apparatus to preconfigure a time delta between calculating the first resource consumption quantity and calculating the second resource consumption quantity. In some aspects, the memory includes programmed instructions that, when executed by the processor, further cause the apparatus to adjust the preconfigured time delta between calculating the first resource consumption quantity and calculating the second resource consumption quantity in response to a user request.

In some aspects, a computer-implemented method includes receiving, at a server, from a first cluster of nodes on an edge network in communication with the server, first resource consumption data of a first service hosted on the edge network, wherein the first resource consumption data is collected at a first time; calculating a first resource consumption quantity based on the first resource consumption data; receiving, from a second cluster of nodes on the edge network, delayed resource consumption data of a second service hosted on the edge network, wherein the delayed resource consumption data collected at the first time; and calculating a second resource consumption quantity based on the delayed resource consumption data.

In some aspects, the method includes sending the first resource consumption quantity to a billing service; and sending the second resource consumption quantity to the billing service, wherein the billing service updates the first resource consumption quantity to include the second resource consumption quantity. In some aspects, the method includes determining that the second resource consumption quantity is different than the first resource consumption quantity; and sending the second resource consumption quantity in response to determining that the second resource consumption quantity being different than the first resource consumption quantity.

In some aspects, the method includes preconfiguring a time delta between calculating the first resource consumption quantity and calculating the second resource consumption quantity. In some aspects, the method includes adjusting the preconfigured time delta between calculating the first resource consumption quantity and calculating the second resource consumption quantity in response to a user request.

Figure 8:
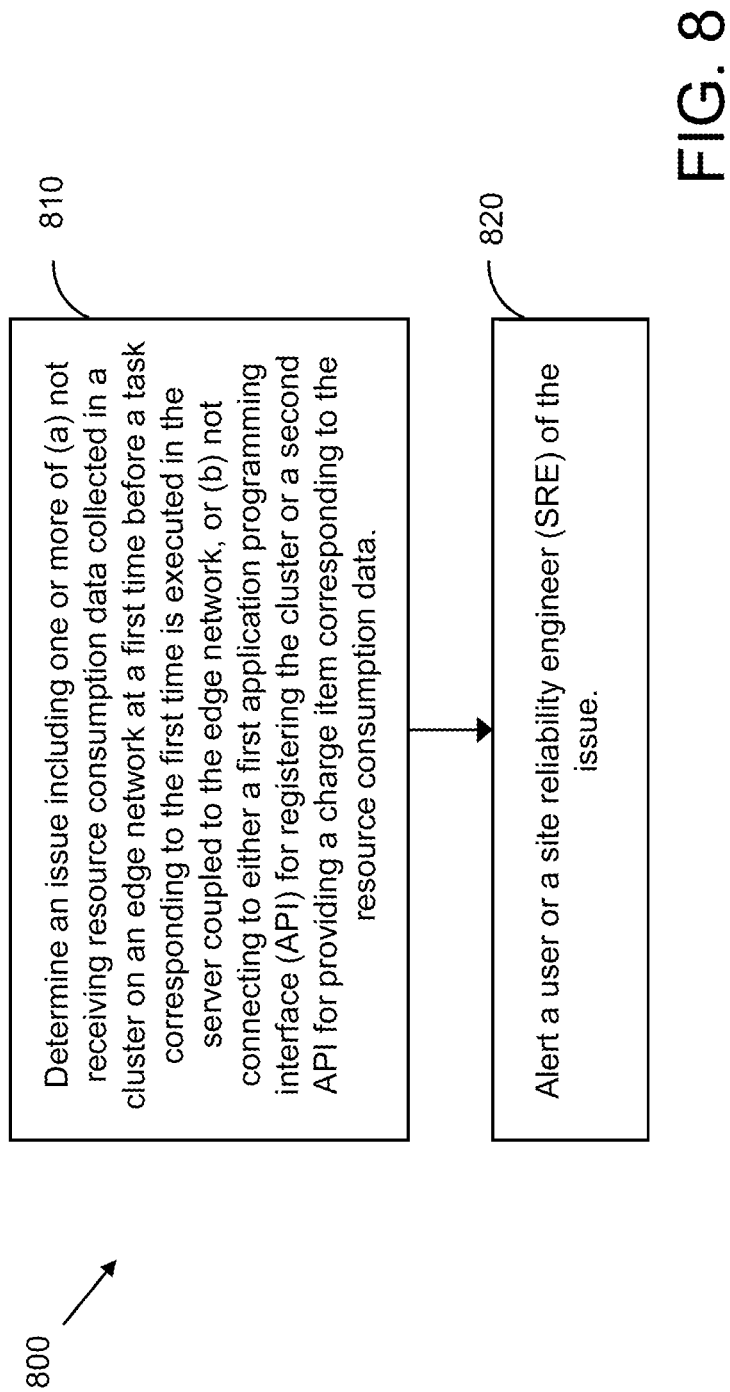
FIG. 8 is an example flowchart of a method for providing alerts, in accordance with some embodiments of the present disclosure.

Referring now to FIG. 8, a flowchart of an example method 800 for providing alerts is illustrated, in accordance with some embodiments of the present disclosure. The method 800 can be performed by one or more systems, components, or modules depicted in FIGS. 1-4, including, for example, the server 105, the metering service 145, the alerts service 155, etc. In some embodiments, instructions for performing the method 800 are executed by a processor included in, or associated with, the one or more systems, components, or modules and stored in a non-transitory computer readable storage medium included in, or associated with, the one or more systems, components, or modules. Additional, fewer, or different operations may be performed in the method 800 depending on the embodiment. One or more operations of the method 800 can be combined with one or more operations of one or more of the methods 500-700.

According to the method 800, a processor (e.g., the alerts service 155 or a processor therein) determines an issue (at operation 810). In some embodiments, the issue includes not receiving resource consumption data (e.g., the buffered cluster resource consumption data 238) before a task (e.g., the task 325, a regular task, a fixer task) is executed. In some embodiments, the resource consumption data is collected in a cluster (e.g., the cluster 120A) on an edge network (e.g., the edge network 110) at a first time. In some embodiments, the task corresponds to the first time (e.g., the task includes other data collected at the first time). In some embodiments, the task is executed in a server (e.g., the server 105) coupled to the edge network. In some embodiments, the processor determines that the resource consumption data collected at the first time is received within a predetermined time after the task (e.g., data delay). In some embodiments, the processor determines that the resource consumption data collected at the first time is not received within a predetermined time after the task (e.g., data loss).

In some embodiments, the issue includes not connecting to either a first application programming interface (API) for registering the cluster or a second API for providing a charge item corresponding to the resource consumption data. In some embodiments, the processor alerts a user or a site reliability engineer (SRE) of the issue (at operation 820).

In some aspects, a non-transitory computer readable storage medium includes instructions stored thereon that, when executed by a processor, cause the processor to determine an issue and alert a user or a site reliability engineer (SRE) of the issue. In some aspects, the issue includes one or more of not receiving resource consumption data before a task is executed or not connecting to either an first application programming interface (API) for registering the cluster or a second API for providing a charge item corresponding to the resource consumption data. In some aspects, the resource consumption data is collected in a cluster on an edge network at a first time. In some aspects, the task includes other data collected at the first time. In some aspects, the task is executed in a server coupled to the edge network.

In some aspects, the medium includes instructions stored thereon that, when executed by a processor, further cause the processor to determine that the resource consumption data collected at the first time is received within a predetermined time after the task. In some aspects, the medium includes instructions stored thereon that, when executed by a processor, further cause the processor to determine that the resource consumption data collected at the first time is not received within a predetermined time after the task.

Referring now to FIG. 9, a flowchart of an example method 900 for validating a metering system is illustrated, in accordance with some embodiments of the present disclosure. The method 900 can be performed by one or more systems, components, or modules depicted in FIGS. 1-4, including, for example, the server 105, the validation service 405, etc. In some embodiments, instructions for performing the method 900 are executed by a processor included in, or associated with, the one or more systems, components, or modules and stored in a non-transitory computer readable storage medium included in, or associated with, the one or more systems, components, or modules. Additional, fewer, or different operations may be performed in the method 900 depending on the embodiment. One or more operations of the method 900 can be combined with one or more operations of one or more of the methods 500-800.

According to the method 900, a processor (e.g., the validation service 405 or a processor therein) provides input data to a cluster or a first service related to metering resource consumption of the cluster under a consumption-based license model (at operation 910). In some embodiments, the input data is a cluster configuration provided to the first service and the first service is the registration service 115. In some embodiments, the input data is a workload provided to the cluster (e.g., one or more services being metered that are a part of the cluster).

In some embodiments, the processor queries the first service or a second service related to metering the resource consumption of the cluster under the consumption-based license model (at operation 920). In some embodiments, the service being queried is the first service (e.g., the registration service 115) and the query is whether the cluster is registered. In some embodiments, the service being queried is the second service (e.g., one of the data processing pipeline 135, the metering service 145, or the billing service 160) and the query is an amount/quantity of resources consumed.

In some embodiments, the processor receives an actual response from the first service or the second service based on the query (at operation 930). In some embodiments, the processor compares the actual response to an expected response (at operation 940). In some embodiments, the processor determines whether the actual response matches the expected response (at operation 950).

In some aspects, a non-transitory computer readable storage medium includes instructions stored thereon that, when executed by a processor, cause the processor to provide input data to a cluster or a first service related to metering resource consumption of the cluster under a consumption-based license model, query one of the first service or a second service related to metering the resource consumption of the cluster under the consumption-based license model, receive an actual response from the one of the first service or the second service based on the query, compare the actual response to an expected response, and determine whether the actual response matches the expected response.

In some aspects, the input data is a cluster configuration, the first service is the registration service, and the query is whether the cluster is registered. In some aspects, the input data is a workload, the second service is one of the data processing pipeline, the metering service, or the billing service, and the query is an amount of resources consumed.

Referring now to FIG. 10, a flowchart of an example method 1000 for registering a cluster under the consumption-based license model is illustrated, in accordance with some embodiments of the present disclosure. The method 1000 can be performed by one or more systems, components, or modules depicted in FIGS. 1-4, including, for example, the server 105, the registration service 115, etc. In some embodiments, instructions for performing the method 1000 are executed by a processor included in, or associated with, the one or more systems, components, or modules and stored in a non-transitory computer readable storage medium included in, or associated with, the one or more systems, components, or modules. Additional, fewer, or different operations may be performed in the method 1000 depending on the embodiment. One or more operations of the method 1000 can be combined with one or more operations of one or more of the methods 500-900.

According to the method 1000, a processor (e.g., the registration service 115 or a processor therein) receives a registration request from a user to register a cluster (e.g., the cluster 120A) or a super-cluster (e.g., the super-cluster 240) under a consumption-based license (at operation 1010). In some embodiments, the user is a service provider. In some embodiments, the processor generates an application programming interface (API) key, or other token, for the user to consume resources on the cluster or super-cluster based on (e.g., according to) the consumption-based license (at operation 1020). In some embodiments, the cluster or super-cluster is on an edge network (e.g., the edge network 110).

In some embodiments, the processor determines whether the cluster or super-cluster is under a term-based license (at operation 1030). In some embodiments, in response to the processor determining that the cluster or super-cluster is under the term-based license, the processor revokes the term-based license (at operation 1040). In some embodiments, the processor transfers credits from the term-based license to the consumption-based license.

In some embodiments, the processor assigns the API key to the cluster or super-cluster (at operation 1050). In some embodiments, the cluster or super-cluster stores the API key locally to apply the consumption-based license. In some embodiments, if the cluster or super-cluster has another API key for the term-based license, the cluster or super-cluster deletes the other API key over overwrites the other API key with the API key. In some embodiments, if the super-cluster stores the API key locally, then the consumption-based license applies to all clusters of the super-cluster.

In some embodiments, the processor receives a registration request from a user to register one or more services on a cluster under a consumption-based license. In some embodiments, the processor registers one or more other services under the term-based license or the one or more other services are already registered under the term-based license. In some embodiments, upon the API key being stored in the cluster, the consumption-based license is only applied to the one or more services and the term-based license remains applied to the one or more other services.

In some aspects, a non-transitory computer readable storage medium comprising instructions stored thereon that, when executed by a processor, cause the processor to receive a registration request from a user, generate an application programming interface (API) key for the user to consume resources in a cluster based on a consumption-based license, and assign the API key to the cluster. In some aspects, the cluster is on an edge network. In some aspects, the cluster stores the API key locally to apply the consumption-based license.

In some aspects, the medium includes instructions stored thereon that, when executed by a processor, further cause the processor to determine whether the cluster is under a term-based license, and, in response to determining that the cluster is under the term-based license, revoke the term-based license. In some aspects, the medium includes instructions stored thereon that, when executed by a processor, cause the processor to further transfer credits from the term-based license to the consumption based license. In some aspects, the user is a service provider.

Each of the components/elements/entities (e.g., the server 105, the edge network 110, the registration service 115, the cluster 120A, the collector 130, the data processing pipeline 135, the data repository 140, the metering service 145, the metering storage 150, the alerts service 155, the billing service 160, the consumption collector 220, the aggregate collector 224, the cluster repository 228, the collector frame service 236, the metering master 305, the metering worker 310A, the validation service 405, etc.) of the computing environments (e.g., the computing environment 100, the computing environment 300, the computing environment 400), is implemented using hardware, software, or a combination of hardware or software, in one or more embodiments. One or more of the components of the computing environments may include a processor with instructions or may be an apparatus/device (e.g., server) including a processor with instructions, in some embodiments. In some embodiments, multiple components may be part of a same apparatus and/or share a same processor. Each of the components of the computing environments can include any application, program, library, script, task, service, process or any type and form of executable instructions executed by one or more processors, in one or more embodiments. Each of the one or more processors is hardware, in some embodiments. The instructions may be stored on one or more computer readable and/or executable storage media including non-transitory storage media.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to disclosures containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, unless otherwise noted, the use of the words "approximate," "about," "around," "substantially," etc., mean plus or minus ten percent.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the disclosure be defined by the claims appended hereto and their equivalents.

What is claimed is:

1. A non-transitory computer readable storage medium comprising instructions stored thereon that, when executed by a processor, cause the processor to:
    collect resource consumption data from a cluster of nodes, wherein the resource consumption data includes a status that indicates whether a service hosted on the cluster of nodes is powered on, a resource being consumed by the service, and a quantity of the resource being consumed by the service;
    transmit the resource consumption data to a remote server in communication with the cluster of nodes in response to the status indicating that the service is powered on, wherein the remote server meters resource consumption of the resource based on the resource consumption data; and
    not transmit the resource consumption data to the remote server in response to the status indicating that the service is powered off.

2. The storage medium of claim 1, wherein the status indicating whether the service hosted on the cluster of nodes is powered on includes a second indication of whether an edge network hosting the cluster of nodes is in a dark-site mode.

3. The storage medium of claim 1, comprising instructions stored thereon that, when executed by a processor, further cause the processor to receive an indication that communication with the remote server is interrupted.

4. The storage medium of claim 3, comprising instructions stored thereon that, when executed by a processor, further cause the processor to:
receive a second indication that communication with the remote server is restored; and
provide, in response to receiving the second indication that communication is restored, the resource consumption data to the remote server.

5. The storage medium of claim 1, wherein the remote server determines that the service is not powered on in response to:
receiving an indication that communication with an edge network hosting the cluster of nodes is active;
receiving second resource consumption data of a second service; and
not receiving the resource consumption data of the service.

6. The storage medium of claim 1, comprising instructions stored thereon that, when executed by a processor, further cause the processor to combine the resource consumption data of the service hosted on the cluster of nodes with second resource consumption data of a second service external to the cluster of nodes.

7. The storage medium of claim 1, comprising instructions stored thereon that, when executed by a processor, further cause the processor to collect the resource consumption data periodically in accordance with a collector configuration.

8. An apparatus comprising a processor and a memory, wherein the memory includes programmed instructions that, when executed by the processor, cause the apparatus to:
collect resource consumption data from a cluster of nodes in an edge network, wherein the resource consumption data includes a status that indicates whether a service hosted on the cluster of nodes on the edge network is powered on, a resource being consumed by the service, and a quantity of the resource being consumed by the service;
transmit the resource consumption data to a remote server in communication with the cluster of nodes in response to the status indicating that the service is powered on, wherein the remote server meters resource consumption of the resource based on the resource consumption data; and
not transmit the resource consumption data to the remote server in response to the status indicating that the service is powered off.

9. The apparatus of claim 8, wherein the status indicating whether the service hosted on the cluster of nodes is powered on includes a second indication of whether an edge network hosting the cluster of nodes is in a dark-site mode.

10. The apparatus of claim 8, wherein the memory includes programmed instructions that, when executed by the processor, further cause the apparatus to receive an indication that communication with the remote server is interrupted.

11. The apparatus of claim 10, wherein the memory includes programmed instructions that, when executed by the processor, further cause the apparatus to:
receive a second indication that communication with the remote server is restored; and
provide, in response to receiving the second indication that communication is restored, the resource consumption data to the remote server.

12. The apparatus of claim 8, wherein the remote server determines that the service is not powered on in response to:
receiving an indication that communication with an edge network hosting the cluster of nodes is active;
receiving second resource consumption data of a second service; and
not receiving the resource consumption data of the service.

13. The apparatus of claim 8, wherein the memory includes programmed instructions that, when executed by the processor, further cause the apparatus to combine the resource consumption data of the service hosted on the cluster of nodes with second resource consumption data of a second service external to the cluster of nodes.

14. The apparatus of claim 8, comprising instructions stored thereon that, when executed by a processor, further cause the processor to collect the resource consumption data periodically in accordance with a collector configuration.

15. A computer-implemented method comprising:
collecting resource consumption data from a cluster of nodes in an edge network, wherein the resource consumption data includes a status that indicates whether a service hosted on the cluster of nodes on the edge network is powered on, a resource being consumed by the service, and a quantity of the resource being consumed by the service;
transmitting the resource consumption data to a remote server in communication with the cluster of nodes in response to the status indicating that the service is powered on, wherein the remote server meters resource consumption of the resource based on the resource consumption data; and
not transmitting the resource consumption data to the remote server in response to the status indicating that the service is powered off.

16. The method of claim 15, wherein the status indicating whether the service hosted on the cluster of nodes is powered on includes a second indication of whether an edge network hosting the cluster of nodes is in a dark-site mode.

17. The method of claim 15, further comprising receiving an indication that communication with the remote server is interrupted.

18. The method of claim 17, further comprising:
receiving a second indication that communication with the remote server is restored; and
providing, in response to receiving the second indication that communication is restored, the resource consumption data to the remote server.

19. The method of claim 15, wherein the remote server determines that the service is not powered on in response to:
receiving an indication that communication with an edge network hosting the cluster of nodes is active;
receiving second resource consumption data of a second service; and
not receiving the resource consumption data of the service.

20. The method of claim 15, further comprising combining the resource consumption data of the service hosted on the cluster of nodes with second resource consumption data of a second service external to the cluster of nodes.

* * * * *